US008924054B1

(12) United States Patent
Arbuckle et al.

(10) Patent No.: US 8,924,054 B1
(45) Date of Patent: Dec. 30, 2014

(54) SYSTEMS AND METHODS FOR POSITIONING A MARINE VESSEL

(71) Applicant: Brunswick Corporation, Lake Forest, IL (US)

(72) Inventors: Jason S. Arbuckle, Horicon, WI (US); Thomas S. Kirchhoff, Fond du Lac, WI (US); Matthew W. Snyder, Fond du Lac, WI (US); Kenneth G. Gable, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 13/829,048

(22) Filed: Mar. 14, 2013

(51) Int. Cl.
*B60L 3/00* (2006.01)
*B60L 15/00* (2006.01)
*G05D 1/00* (2006.01)
*G05D 3/00* (2006.01)
*G06F 7/00* (2006.01)
*G06F 17/00* (2006.01)
*B63H 21/21* (2006.01)

(52) U.S. Cl.
CPC ..................................... *B63H 21/21* (2013.01)
USPC ............. 701/21; 701/466; 701/467; 701/518; 701/527; 701/442; 701/534

(58) Field of Classification Search
CPC ....................................................... B63H 25/42
USPC .......................................... 701/21, 466–467
See application file for complete search history.

(56) References Cited

U.S. PATENT DOCUMENTS

| 3,187,704 | A | 6/1965 | Shatto, Jr. et al. |
| 3,771,483 | A | 11/1973 | Bond |
| 4,009,678 | A | 3/1977 | North |
| 4,220,111 | A | 9/1980 | Krautkremer et al. |

(Continued)

FOREIGN PATENT DOCUMENTS

| DE | 906 907 C | 3/1954 |
| EP | 0 423 901 A1 | 4/1991 |

(Continued)

OTHER PUBLICATIONS

European Search Report for related application EP 10252164.8, having a completion date of Oct. 25, 2012.

(Continued)

*Primary Examiner* — John R Olszewski
*Assistant Examiner* — Tommy Worden
(74) *Attorney, Agent, or Firm* — Andrus Intellectual Property Law LLP

(57) ABSTRACT

Systems and methods are for orienting a marine vessel having a marine propulsion device. A control circuit controls operation of the marine propulsion device. A user input device inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

18 Claims, 14 Drawing Sheets

(56) References Cited

U.S. PATENT DOCUMENTS

| | | | |
|---|---|---|---|
| 4,513,378 A | 4/1985 | Antkowiak | |
| 4,691,659 A | 9/1987 | Ito et al. | |
| 4,769,773 A | 9/1988 | Shatto, Jr. | |
| 5,031,561 A | 7/1991 | Nilsson | |
| 5,090,929 A | 2/1992 | Rieben | |
| 5,108,325 A | 4/1992 | Livingston et al. | |
| 5,172,324 A * | 12/1992 | Knight | 701/21 |
| 5,202,835 A * | 4/1993 | Knight | 701/21 |
| 5,331,558 A * | 7/1994 | Hossfield et al. | 701/21 |
| 5,386,368 A * | 1/1995 | Knight | 701/116 |
| 5,491,636 A * | 2/1996 | Robertson et al. | 701/116 |
| 5,735,718 A | 4/1998 | Ekwall | |
| 5,755,605 A | 5/1998 | Asberg | |
| 5,884,213 A * | 3/1999 | Carlson | 701/21 |
| 6,059,226 A * | 5/2000 | Cotton et al. | 244/17.13 |
| 6,092,007 A * | 7/2000 | Cotton et al. | 701/4 |
| 6,142,841 A | 11/2000 | Alexander, Jr. et al. | |
| 6,230,642 B1 | 5/2001 | McKenney et al. | |
| 6,234,853 B1 | 5/2001 | Lanyi et al. | |
| 6,273,771 B1 * | 8/2001 | Buckley et al. | 440/84 |
| 6,357,375 B1 | 3/2002 | Ellis | |
| 6,377,889 B1 * | 4/2002 | Soest | 701/411 |
| 6,386,930 B2 | 5/2002 | Moffet | |
| 6,431,928 B1 | 8/2002 | Aarnivuo | |
| 6,446,003 B1 * | 9/2002 | Green et al. | 701/468 |
| 6,447,349 B1 | 9/2002 | Fadeley et al. | |
| 6,511,354 B1 | 1/2003 | Gonring et al. | |
| 6,623,320 B1 | 9/2003 | Hedlund | |
| 6,678,589 B2 * | 1/2004 | Robertson et al. | 701/21 |
| 6,705,907 B1 | 3/2004 | Hedlund | |
| 6,712,654 B1 | 3/2004 | Putaansuu | |
| 6,995,527 B2 * | 2/2006 | DePasqua | 318/16 |
| 7,267,068 B2 * | 9/2007 | Bradley et al. | 114/144 R |
| 7,305,928 B2 * | 12/2007 | Bradley et al. | 114/144 R |
| 7,366,593 B2 * | 4/2008 | Fujimoto et al. | 701/21 |
| 7,416,458 B2 * | 8/2008 | Suemori et al. | 440/53 |
| 7,476,134 B1 * | 1/2009 | Fell et al. | 440/38 |
| 8,145,371 B2 * | 3/2012 | Rae et al. | 701/21 |
| 8,155,811 B2 * | 4/2012 | Noffsinger et al. | 701/21 |
| 8,478,464 B2 * | 7/2013 | Arbuckle et al. | 701/21 |
| 2007/0032923 A1 * | 2/2007 | Mossman et al. | 701/4 |
| 2007/0089660 A1 * | 4/2007 | Bradley et al. | 114/144 A |
| 2012/0248259 A1 * | 10/2012 | Page et al. | 244/7 A |

FOREIGN PATENT DOCUMENTS

| | | |
|---|---|---|
| GB | 1173442 | 12/1969 |
| JP | 58-61097 A | 4/1983 |
| JP | 7-223591 A | 8/1995 |
| JP | 2009-227035 A | 10/2009 |
| JP | 2009-241738 A | 10/2009 |
| WO | 2006/058400 A1 | 6/2006 |

OTHER PUBLICATIONS

Strand, Jann Peter et al, Position Control Systems for Offshore Vessels; The Ocean Engineering Handbook, 2001.

* cited by examiner

SYSTEMS AND METHODS FOR POSITIONING A MARINE VESSEL

FIELD

The present disclosure relates generally to systems and methods for positioning and orienting a marine vessel.

BACKGROUND

U.S. Pat. No. 6,273,771, which is hereby incorporated by reference in entirety, discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068, which is hereby incorporated by reference in entirety, discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which is hereby incorporated by reference in entirety, discloses a vessel positioning system that maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A system for orienting a marine vessel is disclosed. The system comprises a marine propulsion device, a control circuit that controls operation of the marine propulsion device, and a user input device that inputs to the control circuit a user-desired global position and a user-desired heading of the marine vessel. The control circuit calculates a position difference between the user-desired global position and an actual global position of the marine vessel and controls the marine propulsion device to minimize the position difference. The control circuit then controls the marine propulsion device to orient an actual heading of the marine vessel towards the user-desired global position when the position difference is greater than a threshold. When the position difference is less than the threshold, the control circuit controls the marine propulsion device to minimize a difference between the actual heading and the user-desired heading while minimizing the position difference.

A method for orienting a marine vessel having at least one marine propulsion device coupled to the marine vessel is also disclosed. The method comprises receiving user inputs for a user-desired global position and a user-desired heading of the marine vessel. The method also comprises receiving measured values of an actual global position and an actual heading of the marine vessel. The method then comprises calculating a position difference between the user-desired global position and the actual global position and controlling the marine propulsion device to minimize the position difference. The method then comprises controlling the marine propulsion device to orient the actual heading of the marine vessel towards the user-desired global position when the position difference is greater than a threshold. The method further comprises controlling the marine propulsion device to minimize a difference between the actual heading and the user-desired heading while minimizing the position difference when the position difference is less than the threshold.

BRIEF DESCRIPTION OF THE DRAWINGS

Examples of systems and methods for positioning a marine vessel are described with reference to the following Figures. The same numbers are used throughout the Figures to reference like features and like components.

DETAILED DESCRIPTION OF THE DRAWINGS

Figure 2:
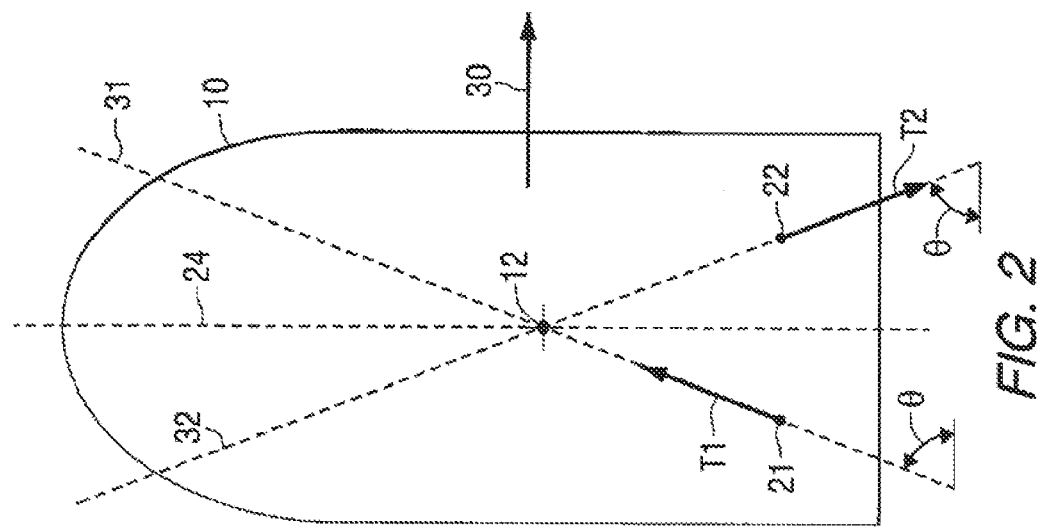
FIGS. 2 and 3 illustrate an arrangement of thrust vectors during a sidle movement of the marine vessel.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Drawing FIGS. 1-14 schematically depict various embodiments of marine vessels and control systems for orienting and maneuvering the marine vessels. It should be understood that the particular configurations of the marine vessels and control systems shown and described are exemplary. It is possible to apply the concepts described in the present disclosure with substantially different configurations for marine vessels and control systems therefor. For example, the marine vessels that are depicted in the drawing figures have first and second marine propulsion devices 27, 28 that have limited ranges or rotation. However, it should be understood that the concepts disclosed in the present disclosure are applicable to marine vessels having any number of marine propulsion devices and any configuration of a propulsion device, such as propeller, impeller, pod drive, and the like. In addition, the control systems described herein include certain operational structures such as global positioning system (GPS) devices and inertial measurement units (IMUs). It should be understood that the concepts disclosed in the present disclosure are capable of being implemented with different types of systems for acquiring global position data and are not limited to the specific types and numbers of such devices described and depicted herein. Further, the present disclosure describes certain types of user input devices such as a joystick 52 and a user input device 122. It should also be recognized that the concepts disclosed in the present disclosure are also applicable in a preprogrammed format without user input, or in conjunction with different types of user input devices, as would be known to one of skill in the art. Further equivalents, alternatives and modifications are also possible as would be recognized by those skilled in the art.

Figure 1:
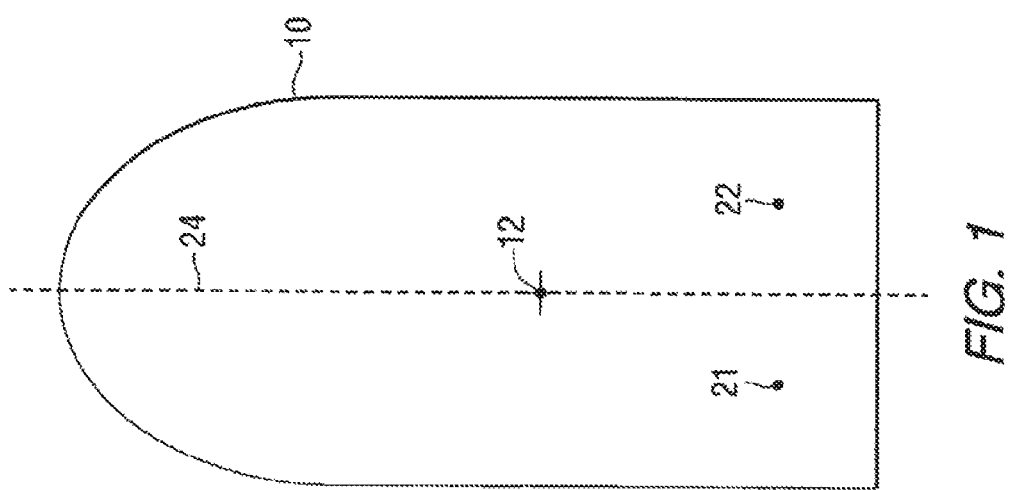
FIG. 1 is a schematic representation of a marine vessel showing steering axes and a center of gravity.

In FIG. 1, a marine vessel 10 is illustrated schematically with its center of gravity 12. First and second steering axes, 21 and 22, are illustrated to represent the location of first and second marine propulsion devices (reference numerals 27 and 28 in FIG. 9) located under the hull of the marine vessel 10. The first and second marine propulsion devices are rotatable about the first and second steering axes, 21 and 22, respectively. The first marine propulsion device, on the port side of a centerline 24, is configured to be rotatable 45 degrees in a clockwise direction, viewed from above the marine vessel 10, and 15 degrees in a counterclockwise direction. The second marine propulsion device, located on the starboard side of the centerline 24, is oppositely configured to rotate 15 degrees in a clockwise direction and 45 degrees in a counterclockwise direction. The ranges of rotation of the first and second marine propulsion devices are therefore symmetrical about the centerline 24 in a preferred embodiment.

The positioning method of the present disclosure rotates the first and second propulsion devices about their respective steering axes, 21 and 22, in an efficient manner that allows rapid and accurate maneuvering of the marine vessel 10. This efficient maneuvering of the first and second marine propulsion devices is particularly beneficial when the operator of the marine vessel 10 is docking the marine vessel or attempting to maneuver it in areas where obstacles exist, such as within a marina.

FIG. 2 illustrates one element of the present disclosure that is used when it is desired to move the marine vessel 10 in a direction represented by arrow 30. In other words, it represents the situation when the operator of the marine vessel wishes to cause it to sidle to the right with no movement in either a forward or reverse direction and no rotation about its center of gravity 12. This is done by rotating the first and second marine propulsion devices so that their thrust vectors, T1 and T2, are both aligned with the center of gravity 12. This provides no effective moment arm about the center of gravity 12 for the thrust vectors, T1 and T2, to exert a force that could otherwise cause the marine vessel 10 to rotate. As can be seen in FIG. 2, the first and second thrust vectors, T1 and T2, are in opposite directions and are equal in magnitude to each other. This creates no resultant forward or reverse force on the marine vessel 10. The first and second thrust vectors are directed along lines 31 and 32, respectively, which intersect at the center of gravity 12. As illustrated in FIG. 2, these two lines, 31 and 32, are positioned at angles theta θ. As such, the first and second marine propulsion devices are rotated symmetrically relative to the centerline 24. As will be described in greater detail below, the first and second thrust vectors, T1 and T2, can be resolved into components, parallel to centerline 24, that are calculated as a function of the sine of angle theta. These thrust components in a direction parallel to centerline 24 effectively cancel each other if the thrust vectors, T1 and T2, are equal to each other since the absolute magnitudes of the angles theta are equal to each other. Movement in the direction represented by arrow 30 results from the components of the first and second thrust vectors, T1 and T2, being resolved in a direction parallel to arrow 30 (i.e. perpendicular to centerline 24) as a function of the cosine of angle theta. These two resultant thrust components which are parallel to arrow 30 are additive. As described above, the moment about the center of gravity 12 is equal to zero because both thrust vectors, T1 and T2, pass through the center of gravity 12 and, as a result, have no moment arms about that point.

While it is recognized that many other positions of the thrust vectors, T1 and T2, may result in the desired sidling represented by arrow 30, the direction of the thrust vectors in line with the center of gravity 12 of the marine vessel 10 is effective and is easy to implement. It also minimizes the overall movement of the propulsion devices during complicated maneuvering of the marine vessel 10. Its effectiveness results from the fact that the magnitudes of the first and second thrusts need not be perfectly balanced in order to avoid the undesirable rotation of the marine vessel 10. Although a general balancing of the magnitudes of the first and second thrusts is necessary to avoid the undesirable forward or reverse movement, no rotation about the center of gravity 12 will occur as long as the thrusts are directed along lines, 31 and 32, which intersect at the center of gravity 12 as illustrated in FIG. 2.

Figure 3:
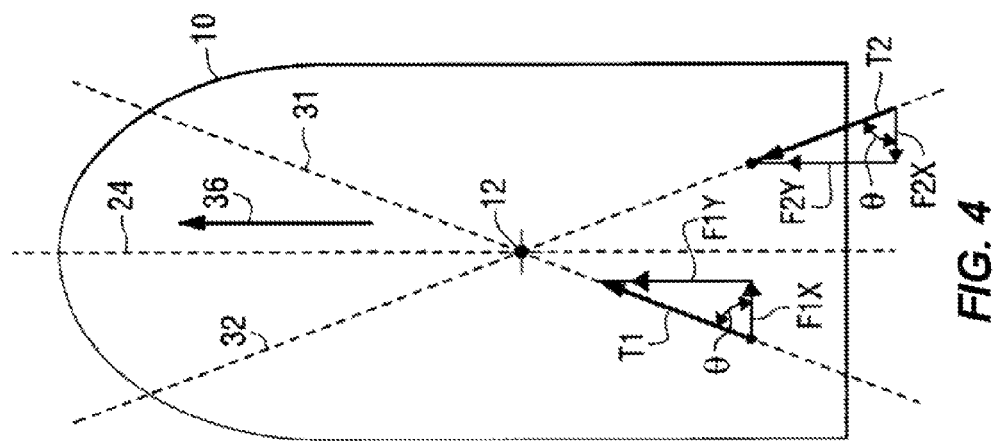

FIG. 3 shows the first and second thrust vectors, T1 and T2, and the resultant forces of those two thrust vectors. For example, the first thrust vector T1 can be resolved into a forward directed force F1Y and a side directed force F1X as shown in FIG. 3 by multiplying the first thrust vector T1 by the sine of theta and the cosine of theta, respectively. Similarly, the second thrust vector T2 is shown resolved into a rearward directed force F2Y and a side directed force F2X by multiplying the second thrust vector T2 by the sine of theta and cosine of theta, respectively. Since the forward force F1Y and rearward force F2Y are equal to each other, they cancel and no resulting forward or reverse force is exerted on the marine vessel 10. The side directed forces, F1X and F2X, on the other hand, are additive and result in the sidle movement represented by arrow 30. Because the lines, 31 and 32, intersect at the center of gravity 12 of the marine vessel 10, no resulting moment is exerted on the marine vessel. As a result, the only movement of the marine vessel 10 is the sidle movement represented by arrow 30.

Figure 4:
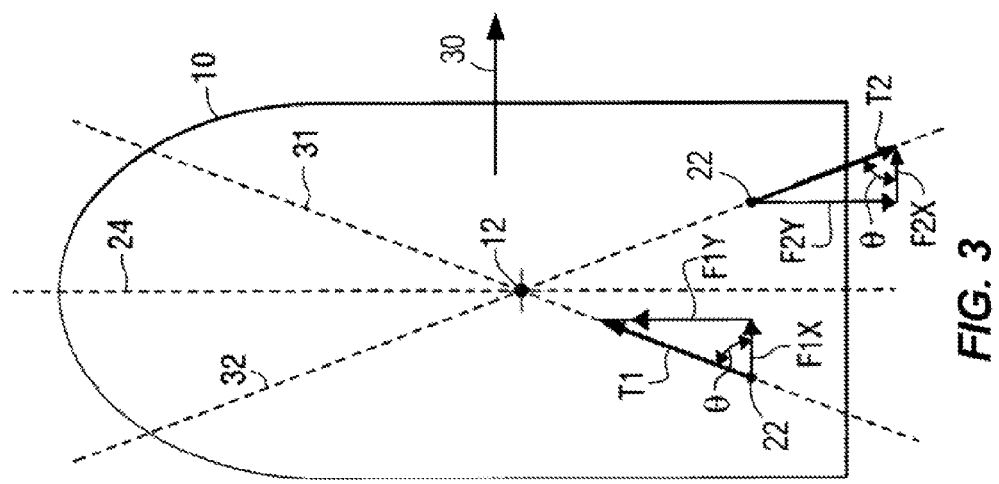
FIG. 4 shows an arrangement of thrust vectors for a forward movement.

FIG. 4 shows the result when the operator of the marine vessel 10 wishes to move in a forward direction, with no side movement and no rotation about the center of gravity 12. The first and second thrusts, T1 and T2, are directed along their respective lines, 31 and 32, and they intersect at the center of gravity 12. Both thrusts, T1 and T2, are exerted in a generally forward direction along those lines. As a result, these thrusts resolve into the forces illustrated in FIG. 4. Side directed forces F1X and F2X are equal to each other and in opposite directions. Therefore, they cancel each other and no sidle force is exerted on the marine vessel 10. Forces F1Y and F2Y, on the other hand, are both directed in a forward direction and result in the movement represented by arrow 36. The configuration of the first and second marine propulsion systems represented in FIG. 4 result in no side directed movement of the marine vessel 10 or rotation about its center of gravity 12. Only a forward movement 36 occurs.

When it is desired that the marine vessel 10 be subjected to a moment to cause it to rotate about its center of gravity 12, the application of the concepts of the present disclosure depend on whether or not it is also desired that the marine vessel 10 be subjected to a linear force in either the forward/reverse or the left/right direction or a combination of both. When the operator wants to cause a combined movement, with both a linear force and a moment exerted on the marine vessel, the thrust vectors, T1 and T2, are caused to intersect at the point 39 as represented by dashed lines 31 and 32 in FIG. 6. If, on the other hand, the operator of the marine vessel wishes to cause it to rotate about its center of gravity 10 with no linear movement in either a forward/reverse or a left/right direction, the thrust vectors, T1' and T2', are aligned in parallel association with each other and the magnitude of the first and second thrust vectors are directed in opposite directions as represented by dashed arrows T1' and T2' in FIG. 6. When the first and second thrust vectors, T1' and T2', are aligned in this way, the angle theta for both vectors is equal to 90 degrees and their alignment is symmetrical with respect to the centerline 24, but with oppositely directed thrust magnitudes.

Figure 5:
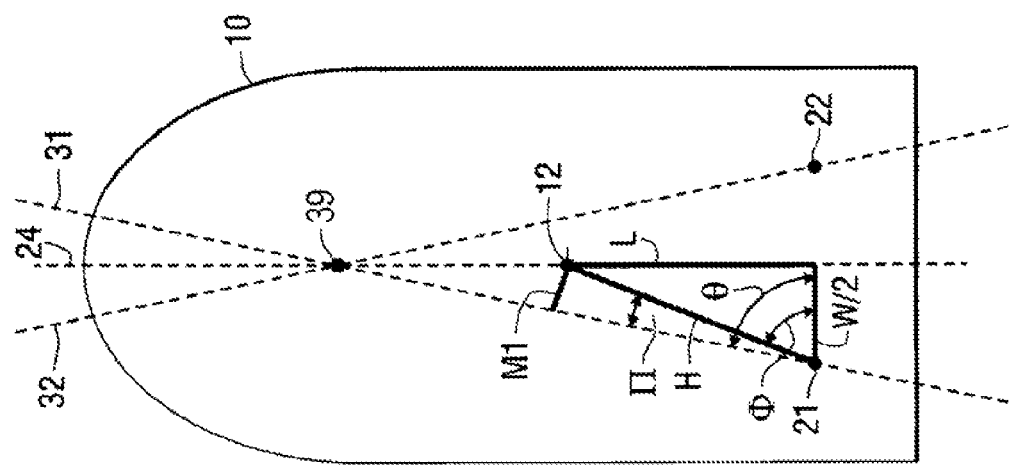
FIG. 5 illustrates the geometry associated with the calculation of a moment arm relative to the center of gravity of a marine vessel.

When a rotation of the marine vessel 10 is desired in combination with linear movement, the first and second marine propulsion devices are rotated so that their thrust vectors intersect at a point on the centerline 24 other than the center of gravity 12 of the marine vessel 10. This is illustrated in FIG. 5. Although the thrust vectors, T1 and T2, are not shown in FIG. 5, their associated lines, 31 and 32, are shown intersecting at a point 39 which is not coincident with the center of gravity 12. As a result, an effective moment arm M1 exists with respect to the first marine propulsion device which is rotated about its first steering axis 21. Moment arm M1 is perpendicular to dashed line 31 along which the first thrust vector T1 is aligned. As such, it is one side of a right triangle which also comprises a hypotenuse H. It should also be understood that another right triangle in FIG. 5 comprises sides L. W/2, and the hypotenuse H. Although not shown in FIG. 5, for purposes of clarity, a moment arm M2 of equal magnitude to moment arm M1 would exist with respect to the second thrust vector T2 directed along line 32. Because of the intersecting nature of the thrust vectors, they each resolve into components in both the forward/reverse and left/right directions. The components, if equal in absolute magnitude to each other, may either cancel each other or be additive. If unequal in absolute magnitude, they may partially offset each other or be additive. However, a resultant force will exist in some linear direction when the first and second thrust vectors T1, T2 intersect at a point 39 on the centerline 24.

With continued reference to FIG. 5, those skilled in the art recognize that the length of the moment arm M can be determined as a function of angle θ, angle Φ, angle Π, the distance between the first and second steering axes, 21 and 22, which is equal to W in FIG. 5, and the perpendicular distance between the center of gravity 12 and a line extending between the first and second steering axes. This perpendicular distance is identified as L in FIG. 5. The length of the line extending between the first steering axis 21 and the center of gravity 12 is the hypotenuse of the triangle shown in FIG. 5 and can easily be determined. The magnitude of angle Φ is equivalent to the arctangent of the ratio of length L to the distance between the first steering axis 21 and the centerline 24, which is identified as W/2 in FIG. 5. Since the length of line H is known and the magnitude of angle Π is known, the length of the moment arm M1 can be mathematically determined.

Figure 6:
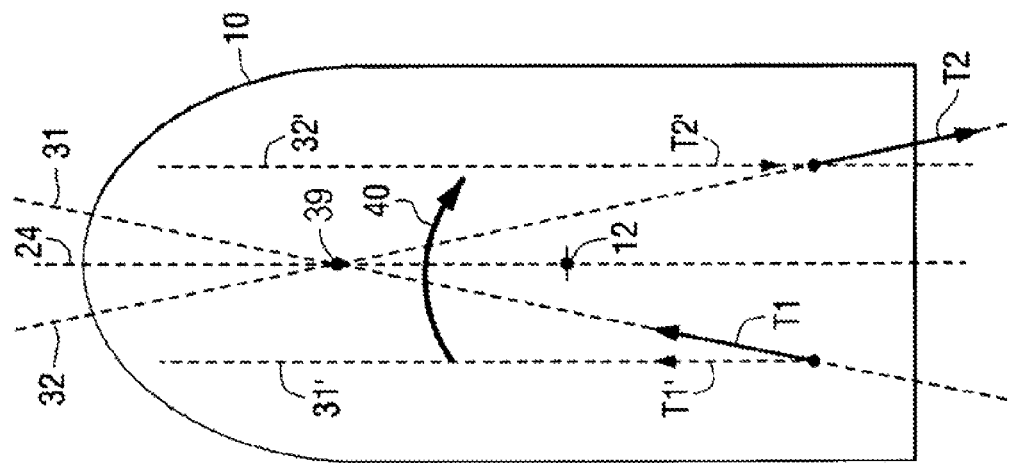
FIG. 6 shows the arrangement of thrust vectors used to rotate the marine vessel about its center of gravity.

As described above, a moment, represented by arrow 40 in FIG. 6, can be imposed on the marine vessel 10 to cause it to rotate about its center of gravity 12. The moment can be imposed in either rotational direction. In addition, the rotating force resulting from the moment 40 can be applied either in combination with a linear force on the marine vessel or alone. In order to combine the moment 40 with a linear force, the first and second thrust vectors, T1 and T2, are positioned to intersect at the point 39 illustrated in FIG. 6. The first and second thrust vectors, T1 and T2, are aligned with their respective dashed lines, 31 and 32, to intersect at this point 39 on the centerline 24 of the marine vessel. If, on the other hand, it is desired that the moment 40 be the only force on the marine vessel 10, with no linear forces, the first and second thrust vectors, represented by T1' and T2' in FIG. 6, are aligned in parallel association with each other. This, effectively, causes angle theta to be equal to 90 degrees. If the first and second thrust vectors, T1' and T2', are then applied with equal magnitudes and in opposite directions, the marine vessel 10 will be subjected only to the moment 40 and to no linear forces. This will cause the marine vessel 10 to rotate about its center of gravity 12 while not moving in either the forward/reverse or the left/right directions.

In FIG. 6, the first and second thrust vectors, T1 and T2, are directed in generally opposite directions and aligned to intersect at the point 39 which is not coincident with the center of gravity 12. Although the construction lines are not shown in FIG. 6, effective moment arms, M1 and M2, exist with respect to the first and second thrust vectors and the center of gravity 12. Therefore, a moment is exerted on the marine vessel 10 as represented by arrow 40. If the thrust vectors T1 and T2 are equal to each other and are exerted along lines 31 and 32, respectively, and these are symmetrical about the centerline 24 and in opposite directions, the net component forces parallel to the centerline 24 are equal to each other and therefore no net linear force is exerted on the marine vessel 10 in the forward/reverse directions. However, the first and second thrust vectors, T1 and T2, also resolve into forces perpendicular to the centerline 24 which are additive. As a result, the marine vessel 10 in FIG. 6 will move toward the right as it rotates in a clockwise direction in response to the moment 40.

In order to obtain a rotation of the marine vessel 10 with no lateral movement in the forward/reverse or left/right directions, the first and second thrust vectors, represented as T1' and T2' in FIG. 6, are directed along dashed lines, 31' and 32', which are parallel to the centerline 24. The first and second thrust vectors, T1' and T2', are of equal and opposite magnitude. As a result, no net force is exerted on the marine vessel 10 in a forward/reverse direction. Since angle theta, with respect to thrust vectors T1' and T2', is equal to 90 degrees, no resultant force is exerted on the marine vessel 10 in a direction perpendicular to the centerline 24. As a result, a rotation of the marine vessel 10 about its center of gravity 12 is achieved with no linear movement.

Figure 7:
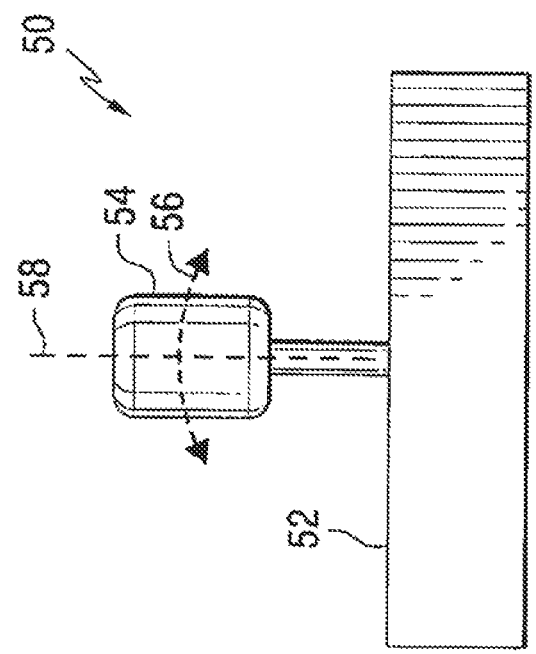

FIG. 7 is a simplified schematic representation of a joystick 50 which provides a manually operable control device which can be used to provide a signal that is representative of a desired movement, selected by an operator, relating to the marine vessel. Many different types of joysticks are known to those skilled in the art. The schematic representation in FIG. 7 shows a base portion 52 and a handle 54 which can be manipulated by hand. In a typical application, the handle is movable in the direction generally represented by arrow 56 and is also rotatable about an axis 58. It should be understood that the joystick handle 54 is movable, by tilting it about its connection point in the base portion 52 in virtually any direction. Although dashed line 56 is illustrated in the plane of the drawing in FIG. 7, a similar type movement is possible in other directions that are not parallel to the plane of the drawing.

Figure 8:
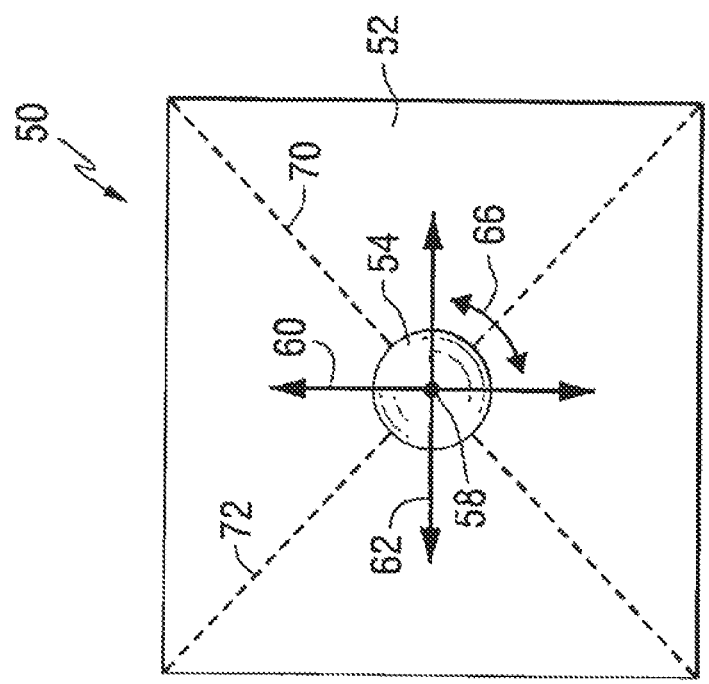
FIGS. 7 and 8 are two schematic representations of a joystick.

FIG. 8 is a top view of the joystick 50. The handle 54 can move, as indicated by arrow 56 in FIG. 7, in various directions which include those represented by arrows 60 and 62. However, it should be understood that the handle 54 can move in any direction relative to axis 58 and is not limited to the two lines of movement represented by arrows 60 and 62. In fact, the movement of the handle 54 has a virtually infinite number of possible paths as it is tilted about its connection point within the base 52. The handle 54 is also rotatable about axis 58, as represented by arrow 66. Those skilled in the art are familiar with many different types of joystick devices that can be used to provide a signal that is representative of a desired movement of the marine vessel, as expressed by the operator of the marine vessel through movement of the handle 54.

With continued reference to FIG. 8, it can be seen that the operator can demand a purely linear movement either toward port or starboard, as represented by arrow 62, a purely linear movement in a forward or reverse direction as represented by arrow 60, or any combination of the two. In other words, by moving the handle 54 along dashed line 70, a linear movement toward the right side and forward or toward the left side and rearward can be commanded. Similarly, a linear movement along lines 72 could be commanded. Also, it should be understood that the operator of the marine vessel can request a combination of sideways or forward/reverse linear movement in combination with a rotation as represented by arrow 66. Any of these possibilities can be accomplished through use of the joystick 50. The magnitude, or intensity, of movement represented by the position of the handle 54 is also provided as an output from the joystick. In other words, if the handle 54 is moved slightly toward one side or the other, the commanded thrust in that direction is less than if, alternatively, the handle 54 was moved by a greater magnitude away from its vertical position with respect to the base 52. Furthermore, rotation of the handle 54 about axis 58, as represented by arrow 66, provides a signal representing the intensity of desired movement. A slight rotation of the handle about axis 58 would represent a command for a slight rotational thrust about the center of gravity 12 of the marine vessel 10. On the other hand, a more intense rotation of the handle 54 about its axis would represent a command for a higher magnitude of rotational thrust.

With reference to FIGS. 1-8, it can be seen that movement of the joystick handle 54 can be used by the operator of the marine vessel 10 to represent virtually any type of desired movement of the marine vessel 10. In response to receiving a signal from the joystick 50, an algorithm, for example carried out by a microcontroller 116 (see FIG. 11), determines whether or not a rotation 40 about the center of gravity 12 is requested by the operator. If no rotation is requested, the first and second marine propulsion devices are rotated so that their thrust vectors align, as shown in FIGS. 2-4, with the center of gravity 12 and intersect at that point. This results in no moment being exerted on the marine vessel 10 regardless of the magnitudes or directions of the first and second thrust vectors, T1 and T2. The magnitudes and directions of the first and second thrust vectors are then determined mathematically, as described above in conjunction with FIGS. 3 and 4. If, on the other hand, the signal from the joystick 50 indicates that a rotation about the center of gravity 12 is requested, the first and second marine propulsion devices are directed along lines, 31 and 32, that do not intersect at the center of gravity 12. Instead, they intersect at another point 39 along the centerline 24. As shown in FIG. 6, this intersection point 39 can be forward from the center of gravity 12. The thrusts, T1 and T2, shown in FIG. 6 result in a clockwise rotation 40 of the marine vessel 10. Alternatively, if the first and second marine propulsion devices are rotated so that they intersect at a point along the centerline 24 which is behind the center of gravity 12, an opposite effect would be realized. It should also be recognized that, with an intersect point 39 forward from the center of gravity 12, the directions of the first and second thrusts, T1 and T2, could be reversed to cause a rotation of the marine vessel 10 in a counterclockwise direction.

In the various maneuvering steps described in conjunction with FIGS. 1-6, it can be seen that the first and second marine propulsion devices can be directed so that they intersect along the centerline 24. That point of intersection can be at the center of gravity 12 or at another point such as point 39. In addition, the lines, 31 and 32, along which the first and second thrust vectors are aligned, are symmetrical in all cases. In other words, the first and second marine propulsion devices are positioned at angles theta relative to a line perpendicular to the centerline 24. The thrust vectors are, however, aligned in opposite directions relative to the centerline 24 so that they are symmetrical to the centerline even though they may be in opposite directions as illustrated in FIG. 6.

While it is recognized that the movements of the marine vessel 10 described above can be accomplished by rotating the marine propulsion devices in an asymmetrical way, contrary to the description of the present disclosure in relation to FIGS. 1-6, the speed and consistency of movement are enhanced by the consistent alignment of the first and second thrust vectors at points along the centerline 24 and, when no rotation about the center of gravity 12 is required, at the center of gravity itself. This symmetrical movement and positioning of the first and second marine propulsion devices simplifies the necessary calculations to determine the resolved forces and moments and significantly reduces the effects of any errors in the thrust magnitudes.

As described above, in conjunction with FIGS. 1-6, the first and second thrust vectors, T1 and T2, can result from either forward or reverse operation of the propellers of the first and second marine propulsion devices. In other words, with respect to FIG. 6, the first thrust vector T1 would typically be provided by operating the first marine propulsion device in forward gear and the second thrust vector T2 would be achieved by operating the second marine propulsion device in reverse gear. However, as is generally recognized by those skilled in the art, the resulting thrust obtained from a marine propulsion device by operating it in reverse gear is not equal in absolute magnitude to the resulting thrust achieved by operating the propeller in forward gear. This is the result of the shape and hydrodynamic effects caused by rotating the propeller in a reverse direction. However, this effect can be determined and calibrated so that the rotational speed (RPM) of the reversed propeller can be selected in a way that the effective resulting thrust can be accurately predicted. In addition, the distance L between the line connecting the first and second steering axes, 21 and 22, and the center of gravity 12 can be determined for the marine vessel 10 so that the operation of the algorithm of the present disclosure is accurate and optimized. This determination is relatively easy to accomplish. Initially, a presumed location of the center of gravity 12 is determined from information relating to the structure of the marine vessel 10. With reference to FIG. 3, the first and second marine propulsion devices are then aligned so that their thrust vector lines, 31 and 32, intersect at the presumed location of the center of gravity 12. Then, the first and second thrusts, T1 and T2, are applied to achieve the expected sidle movement 30. If any rotation of the marine vessel 10 occurs about the actual center of gravity, the length L (illustrated in FIG. 5) is presumed to be incorrect. That length L is then changed slightly and stored in a memory of a microcontroller 116 (FIG. 11) and the procedure is repeated. When the sidle movement 30 occurs without any rotation about the currently assumed center of gravity, it can be concluded that the currently presumed location of the center of gravity 12 and the magnitude of length L are correct. It should be understood that the centerline 24, in the context of the present disclosure, is a line which extends through the center of gravity of the marine vessel 10. It need not be perfectly coincident with the keel line of the marine vessel, but it is expected that in most cases it will be.

As mentioned above, propellers do not have the same effectiveness when operated in reverse gear than they do when operated in forward gear for a given rotational speed. Therefore, with reference to FIG. 3, the first thrust T1 would not be perfectly equal to the second thrust T2 if the two propellers systems were operated at identical rotational speeds. In order to determine the relative efficiency of the propellers when they are operated in reverse gear, a relatively simple calibration procedure can be followed. With continued reference to FIG. 3, first and second thrusts, T1 and T2, are provided in the directions shown and aligned with the center of gravity 12. This should produce the sidle movement 30 as illustrated. However, this assumes that the two thrust vectors, T1 and T2, are equal to each other. In a typical calibration procedure, it is initially assumed that the reverse operating propeller providing the second thrust T2 would be approximately 80% as efficient as the forward operating propeller providing the first thrust vector T1. The rotational speeds were selected accordingly, with the second marine propulsion device operating at 125% of the speed of the first marine propulsion device. If a forward or reverse movement is experienced by the marine vessel 10, that initial assumption would be assumed to be incorrect. By slightly modifying the assumed efficiency of the reverse operating propeller, the system can eventually be calibrated so that no forward or reverse movement of the marine vessel 10 occurs under the situation illustrated in FIG. 3. In an actual example, this procedure was used to determine that the operating efficiency of the propellers, when in reverse gear, is approximately 77% of their efficiency when operated in forward gear. Therefore, in order to balance the first and second thrust vectors, T1 and T2, the reverse operating propellers of the second marine propulsion device would be operated at a rotational speed (RPM) which is approximately 29.87% greater than the rotational speed of the propellers of the first marine propulsion device. Accounting for the inefficiency of the reverse operating propellers, this technique would result in generally equal magnitudes of the first and second thrust vectors, T1 and T2.

Figure 9:
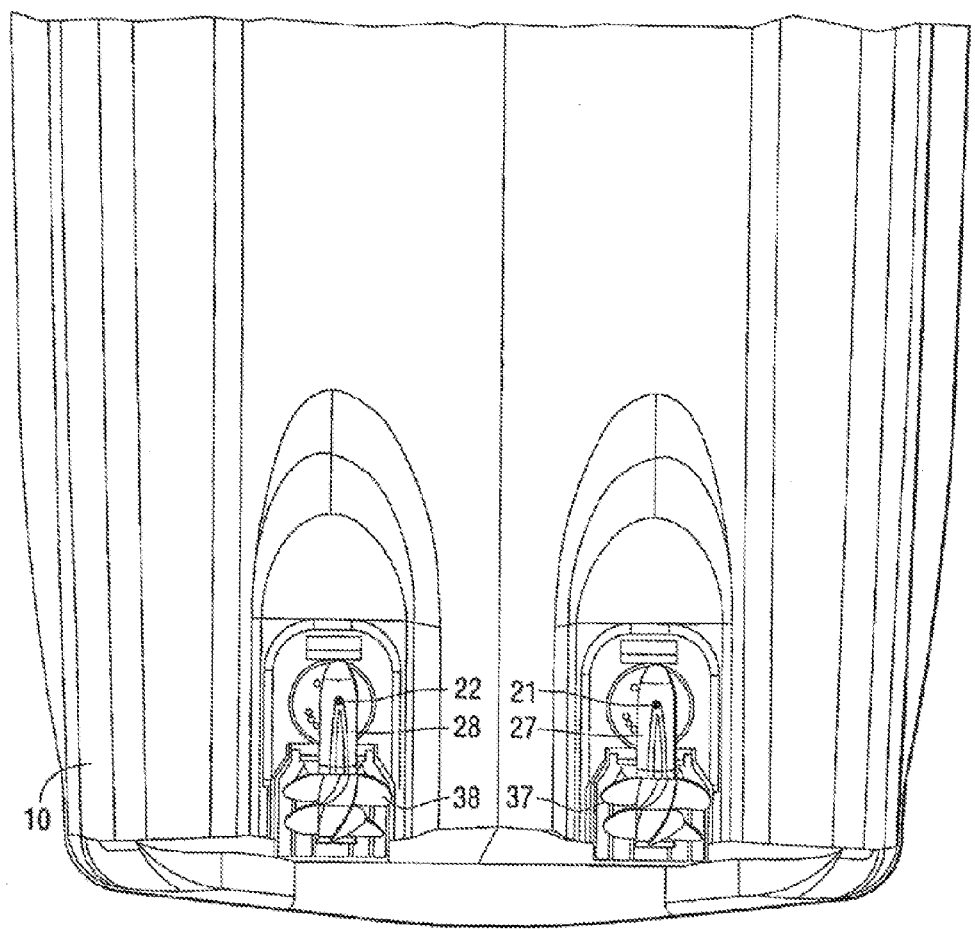
FIG. 9 is a bottom view of a hull of a marine vessel showing first and second marine propulsion devices extending therethrough.

FIG. 9 is a view of the bottom portion of a hull of a marine vessel 10, showing first and second marine propulsion devices, 27 and 28, and propellers, 37 and 38, respectively. The first and second marine propulsion devices, 27 and 28, are rotatable about generally vertical steering axes, 21 and 22, as described above. In order to avoid interference with portions of the hull of the marine vessel 10, the two marine propulsion devices 27, 28 are provided with limited rotational steering capabilities as described above. In one example, neither the first nor the second marine propulsion device is provided with the capability of rotating 360 degrees about its respective steering axis, 21 or 22.

Figure 10:
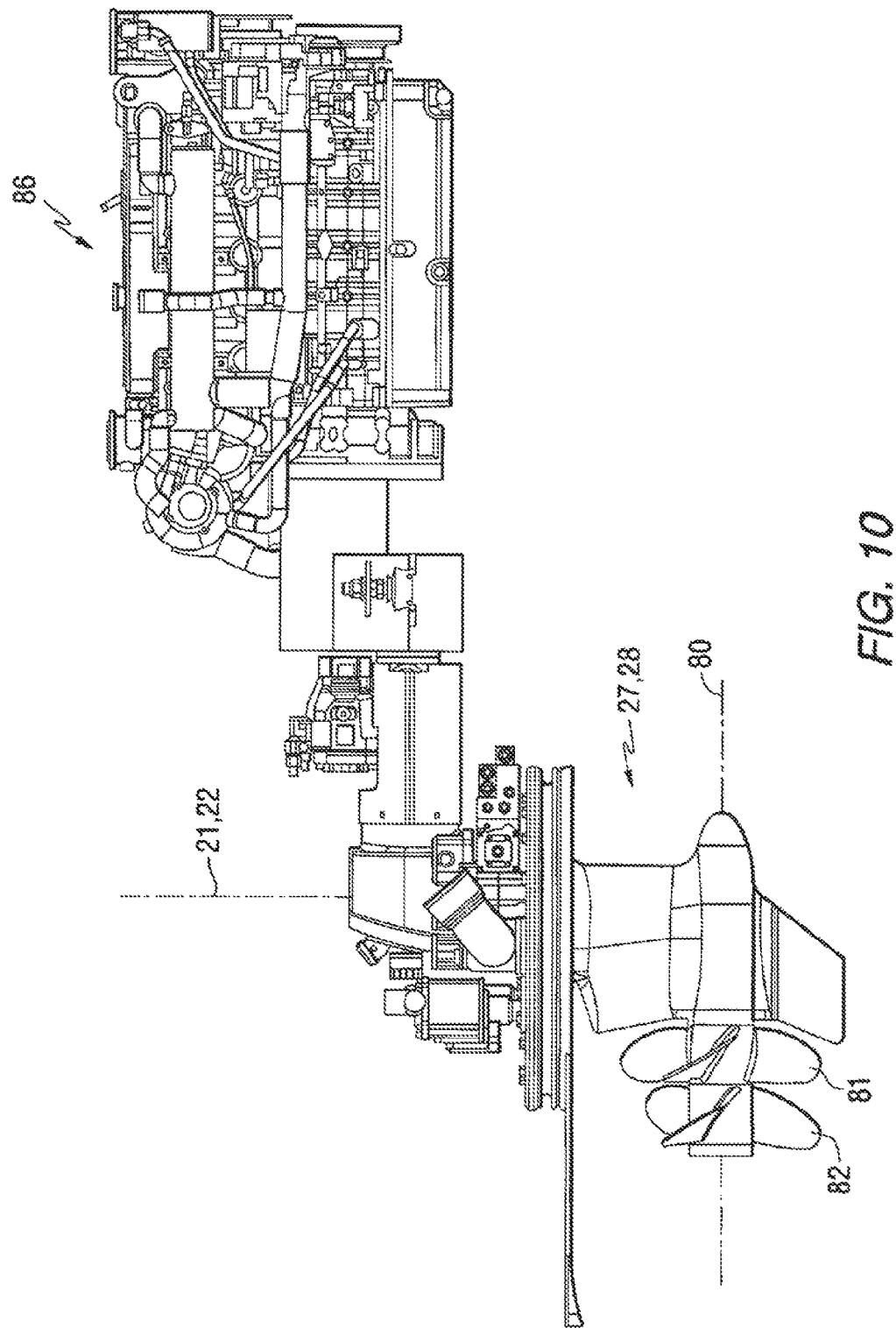
FIG. 10 is a side view showing an arrangement of an engine, steering mechanism, and marine propulsion device.

FIG. 10 is a side view showing the arrangement of a marine propulsion device, such as 27 or 28, associated with a mechanism that is able to rotate the marine propulsion device about its steering axis, 21 or 22. Although not visible in FIG. 10, the driveshaft of the marine propulsion device extends vertically and parallel to the steering axis and is connected in torque transmitting relation with a generally horizontal propeller shaft that is rotatable about a propeller axis 80. The embodiment shown in FIG. 10 comprises two propellers, 81 and 82, that are attached to the propeller shaft. The motive force to drive the propellers, 81 and 82, is provided by an internal combustion engine 86 that is located within the bilge of the marine vessel 10. It is configured with its crankshaft aligned for rotation about a horizontal axis. In one example, the engine 86 is a diesel engine. Each of the two marine propulsion devices, 27 and 28, can be driven by a separate engine 86. In addition, each of the marine propulsion devices, 27 and 28, are independently steerable about their respective steering axes, 21 or 22. The steering axes, 21 and 22, are generally vertical and parallel to each other. They are not intentionally configured to be perpendicular to the bottom surface of the hull. Instead, they are generally vertical and intersect the bottom surface of the bull at an angle that is not equal to 90 degrees when the bottom surface of the hull is a V-type hull or any other shape which does not include a flat bottom.

With continued reference to FIG. 10, the submerged portion of the marine propulsion device, 27 or 28, contains rotatable shafts, gears, and bearings which support the shafts and connect the driveshaft to the propeller shaft for rotation of the propellers 81, 82. No source of motive power is located below the hull surface. The power necessary to rotate the propellers 81, 82 is solely provided by the internal combustion engine 86. Alternate propulsive means could be employed such as electric motors, gasoline engines, and the like.

Figure 11:
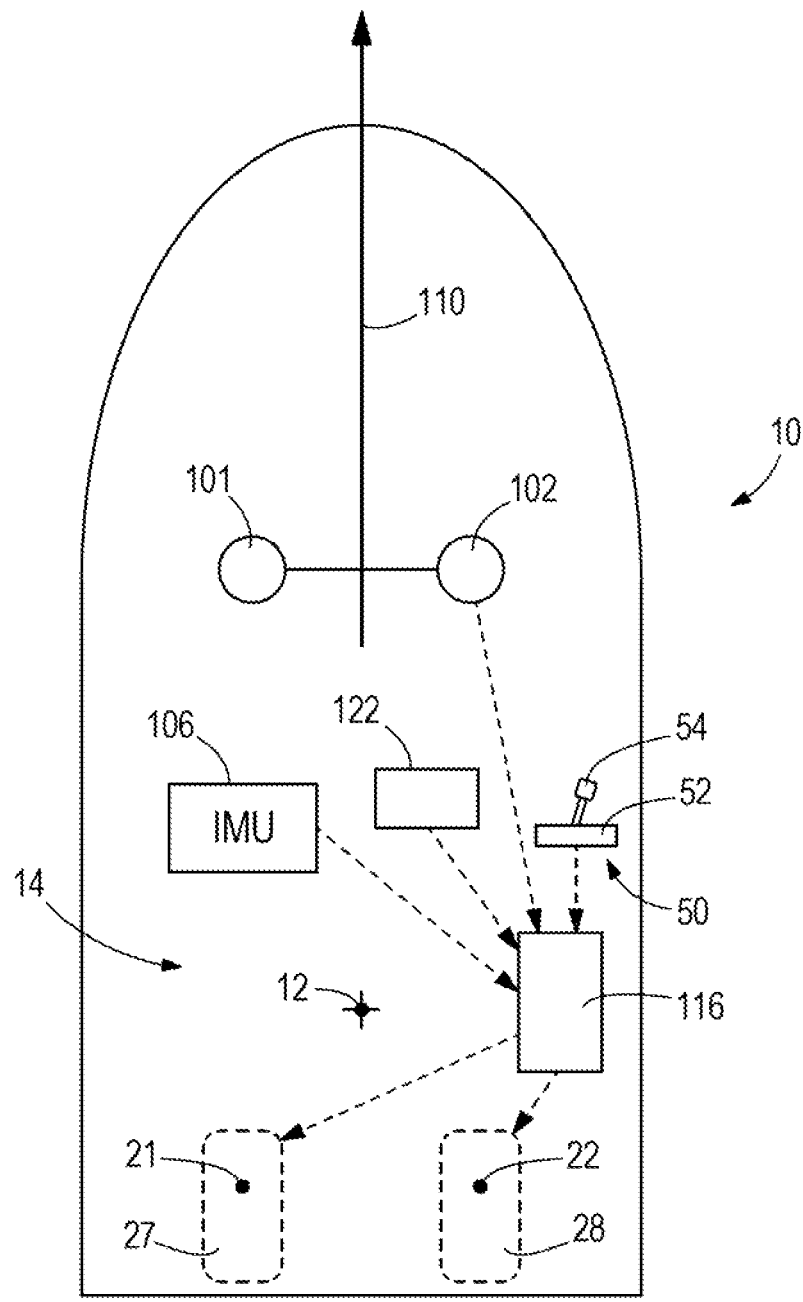
FIG. 11 is a schematic representation of a marine vessel equipped with devices for performing a station keeping function.

FIG. 11 is a schematic representation of a marine vessel 10 having a control circuit 14 which is configured to perform the steps of an exemplary method for maintaining a marine vessel in a selected position. The marine vessel 10 is provided with a global positioning system (GPS) which, in a preferred embodiment, comprises a first GPS device 101 and a second GPS device 102 which are each located at preselected fixed positions on the marine vessel 10 and provide information related to the global position of the marine vessel 10 in terms of latitude and longitude. The GPS system also includes an inertial measurement unit (IMU) 106. The IMU 106 can be, for example, part 8M0048162 available from Mercury Marine, of Fond du Lac, Wis. In certain embodiments of the IMU 106, it comprises a differential correction receiver, accelerometers, angular rate sensors, and a microprocessor which manipulates the information obtained from these devices to provide information relating to the current position of the marine vessel 10, in terms of longitude and latitude, the current heading of the marine vessel 10, represented by arrow 110 in FIG. 11, and the velocity and acceleration of the marine vessel 10 in six degrees of freedom.

FIG. 11 also shows a microcontroller 116. The microcontroller 116 includes a memory, a programmable processor, and programmable input/output peripherals. As is conventional, the processor can be communicatively connected to a computer readable medium that includes volatile or nonvolatile memory upon which computer readable code is stored. The processor can access the computer readable code and the computer readable medium upon executing the code carries out functions as described herein below. The microcontroller 116 can receive inputs and send outputs via a CAN bus as described in U.S. Pat. No. 6,273,771. In other examples, the microcontroller 116 is connected to other devices on the marine vessel 10 via wireless communication rather than by a serially wired CAN bus. The microcontroller 116 receives inputs from the IMU 106. The microcontroller 116 also receives information from a user input device 122, which allows the operator of the marine vessel 10 to provide manually selectable modes of operation. As an example, the user input device 122 can be an input screen that allows the operator of the marine vessel to manually select various modes of operation associated with the marine vessel 10. One of those selections made by the operator of the marine vessel can provide an enabling signal which informs the microcontroller 116 that the operator desires to operate the vessel 10 in a station keeping mode in order to maintain the position of the marine vessel in a selected position. In other words, the operator can use the user input device 122 to activate the present system so that the marine vessel 10 is maintained at a selected global position (e.g. a selected longitude and latitude) and a selected heading (e.g. with arrow 110 being maintained at a fixed position relative to a selected compass point). See FIG. 12.

With reference back to FIG. 11, a manually operable control device, such as the joystick 50, can also be used to provide a signal to the microcontroller 116. As described above, the joystick 50 can be used to allow the operator of the marine vessel to manually maneuver the marine vessel 10. It can also provide information to the microcontroller 116 regarding its being in an active status or inactive status. While the operator is manipulating the joystick 50, the joystick is in an active status. However, if the operator releases the joystick 50 and allows the handle 54 to return to its centered and neutral position, the joystick 50 reverts to an inactive status. As will be described in greater detail below, a particularly preferred embodiment can use the information relating to the active or inactive status of the joystick 50 in combination with an enabling mode received from the user input device 122 to allow the operator to select the station keeping mode of the present disclosure. In this embodiment, the operator can use the joystick 50 to manually maneuver the marine vessel 10 into a particularly preferred position, represented by a global position and a heading, and then release the joystick 50 to immediately and automatically request the control circuit 14 to maintain that newly achieved global position and heading. This embodiment can be particularly helpful during docking procedures.

As described above, the first and second marine propulsion devices, 27 and 28, are steerable about their respective axes, 21 and 22. Signals provided by the microcontroller 116 allow the first and second marine propulsion devices to be independently rotated about their respective steering axes in order to coordinate the movement of the marine vessel 10 in response to operator commands.

Figure 12:
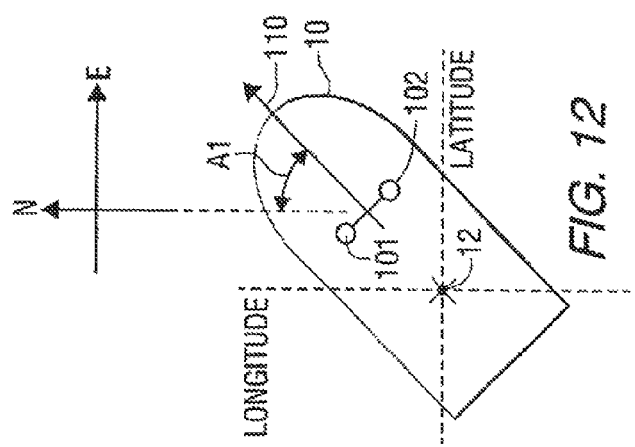
FIG. 12 is a representation of a marine vessel at a particular global position and with a particular heading.

FIG. 12 shows a marine vessel 10 at an exemplary global position, measured as longitude and latitude, and an exemplary heading represented by angle A1 between the heading arrow 110 of the marine vessel 10 and a due north vector N. Although alternative position defining techniques can be used in conjunction with the presently described examples, one example uses both the global position and heading of the vessel 10 for the purpose of determining the current position of the marine vessel 10 and calculating the necessary position and heading corrections to return the marine vessel 10 to its desired position and desired heading.

As described above, the GPS devices 101 and 102 and the IMU 106 determine the information relating to the position and heading of the marine vessel 10. For exemplary purposes, the position will be described in terms of the position of the center of gravity 12 of the marine vessel 10 and a heading vector 110 which extends through the center of gravity 12. However, it should be understood that alternative locations on the marine vessel 10 can be used for these purposes. The IMU 106, described above in conjunction with FIG. 11, provides a means by which this location on the marine vessel 10 can be selected.

The station keeping function, which maintains the desired global position and desired heading of the marine vessel 10, can be activated in several ways. In one example, the operator of the marine vessel can actuate a switch that commands the microcontroller 116 to maintain the current position whenever the switch is actuated. In one example, the station keeping mode is activated when the operator of the marine vessel enables the station keeping function when the joystick 50 is inactive. If the station keeping mode is enabled, but the joystick 50 is being manipulated by the operator of the marine vessel, in one example the station keeping mode is then deactivated because of the apparent desire of the operator of the marine vessel to manipulate its position manually. However, as soon as the joystick 50 is released by the operator, this inactivity of the joystick in combination with the enabled station keeping mode causes the control circuit 14 to resume its position maintaining function.

Figure 13:
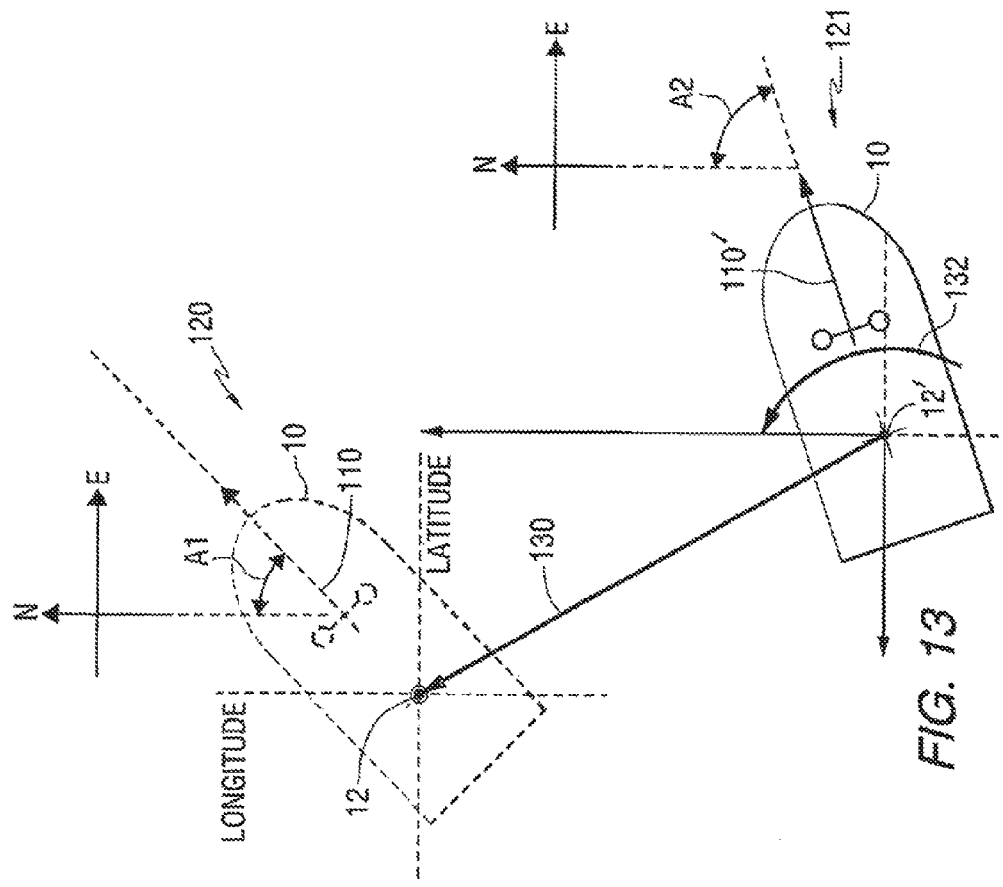
FIG. 13 shows a marine vessel which has moved from an initial position to a subsequent position.

FIG. 13 is a schematic representation that shows the marine vessel 10 in two exemplary positions. An initial, or desired, position 120 is generally identical to that described above in conjunction with FIG. 12. The initial position 120 of the marine vessel 10 is defined by a global position and a heading. The global position is identified by the longitude and latitude of the center of gravity 12 when the vessel 10 is at its initial, or desired, position 120. The heading, represented by angle A1, is associated with the vessel heading when it is at its initial position 120. In one example, the initial position 120 is defined by a user-desired global position and a user-desired heading of the marine vessel 10.

FIG. 13 also shows the marine vessel 10 with the global position of its center of gravity 12' moved to a location represented by a subsequent position 121 of the marine vessel 10.

In addition, in the subsequent position 121, the marine vessel 10 is illustrated as having rotated slightly in a clockwise direction so that its heading vector 110' is now defined by a larger angle A2 with respect to the due north vector N. In one example, the subsequent position 121 is defined by an actual global position and an actual heading of the marine vessel 10.

With continued reference to FIG. 13, it should be understood that the difference in position between the initial user-desired position 120 and the actual subsequent position 121 is significantly exaggerated so that the response by the control circuit 14 can be clearly described. In one example, the microcontroller 116 determines a difference between a user-desired position, such as the initial position 120, and the actual position, such as the subsequent position 121, that resulted from the marine vessel 10 drifting. This drift of the marine vessel 10 can occur because of wind, tide, or current.

The microcontroller 116 compares the actual global position and heading of the marine vessel 10 to the previously stored user-desired global position and heading. An error, or difference, in the north, east, and heading framework is computed as the difference between the user-desired global position and heading and the actual global position and heading. This error, or difference, is then converted to an error, or difference, in the forward, right, and heading framework of the vessel, which is sometimes referred to as the body framework. These vessel framework error elements are then used by the control strategies that will be described in greater detail below, which attempt to simultaneously null the error, or difference, elements. Through the use of a PID controller, a desired force is computed in the fore/aft and left/right directions, with reference to the marine vessel 10, along with a desired yaw moment relative to the marine vessel 10 in order to null the error elements. The computed force and moment elements are then transmitted to the vessel maneuvering system described above which delivers the requested forces and moments by positioning the independently steerable marine propulsion devices 27, 28, controlling the power provided to the propellers 37, 38 of each device, and controlling the thrust vector directions of both marine propulsion devices 27, 28.

The difference between the user-desired position 120 and the actual position 121 can be reduced if the marine vessel 10 is subjected to an exemplary target linear thrust 130 and a target moment 132. The target linear thrust 130 and the target moment 132, in a preferred embodiment, are achieved by a manipulation of the first and second marine propulsion devices 27, 28 as described above in conjunction with FIGS. 2-6. The target linear thrust 130 will cause the marine vessel 10 to move towards its initial, or user-desired, position 120, which is measured as a magnitude of longitude and latitude. The target moment 132 will cause the marine vessel 10 to rotate about its center of gravity 12 so that its heading vector 110' moves from the actual position 121 to the user-desired position 120. This reduces the heading angle from the larger magnitude of angle A2 to the smaller magnitude of A1. Both the target linear thrust 130 and target moment 132 are computed to decrease the errors between the actual global position and heading at location 121 and the user-desired global position and heading at location 120.

With continued reference to FIG. 13, it should be recognized that the station keeping mode is not always intended to move the marine vessel 10 by significant distances. Instead, the control circuit's continual response to slight changes in global position and heading will more likely maintain the marine vessel 10 in position without requiring perceptible movements of the marine vessel 10. In other words, the first and second marine propulsion devices 27, 28 are selectively activated in response to slight deviations in the global position and heading of the marine vessel 10 and, as a result, large corrective moves such as that is illustrated in FIG. 13 will not normally be required. As a result, the thrusts T1, T2 provided by the first and second marine propulsion devices 27, 28 continually counter the thrusts on the marine vessel 10 caused by wind, current, and tide so that the net result is an appearance that the marine vessel 10 is remaining stationary and is unaffected by the external forces.

However, alternative examples could be used to cause the marine vessel 10 to move to a position, defined by a user-desired global position and heading, that was previously stored in the memory of the microcontroller 116. Under those conditions, a relatively larger target linear thrust 130 and target moment 132 could be used to move the marine vessel 10 to the initial position 120 when that initial position 120 is selected from the memory and the station keeping mode is enabled. As an example, a user-desired position, such as the position identified by reference numeral 120 in FIG. 13, can be stored in the microcontroller 116 and then recalled, perhaps days later, after the operator of the marine vessel has moved the marine vessel 10 to a position in the general vicinity of the stored user-desired position 120. In other words, if the operator of the marine vessel maneuvers it to a location, such as the location identified by reference numeral 121 in FIG. 13, the station keeping mode can be enabled and activated. Under those conditions, the control circuit 14 will cause the marine vessel 10 to move to its stored user-desired position 120 that was selected and saved at some previous time. This technique could possibly be advantageous in returning the marine vessel 10 to a desirable fishing location or to a docking position after the operator has maneuvered the marine vessel 10 into a position that is generally close to the user-desired position 120.

In one example, the microcontroller 116, as described above in conjunction with FIG. 11, allows the operator to manually manipulate the joystick 50 so that the marine vessel 10 is positioned in response to the desire of the operator. As this process continues, the operator of the marine vessel may choose to release the joystick 50. At that instant in time, the station keeping mode is immediately activated, if enabled, and the marine vessel is maintained at the most recent position and heading of the marine vessel 10 when the joystick 50 initially became inactive as the operator released it. The operator could subsequently manipulate the joystick 50 again to make slight corrections in the position and heading of the marine vessel 10. As that is being done, the station keeping mode is temporarily deactivated. However, if the operator of the marine vessel again releases the joystick 50, its inactivity will trigger the resumption of the station keeping mode if it had been previously enabled by the operator.

Figure 14:
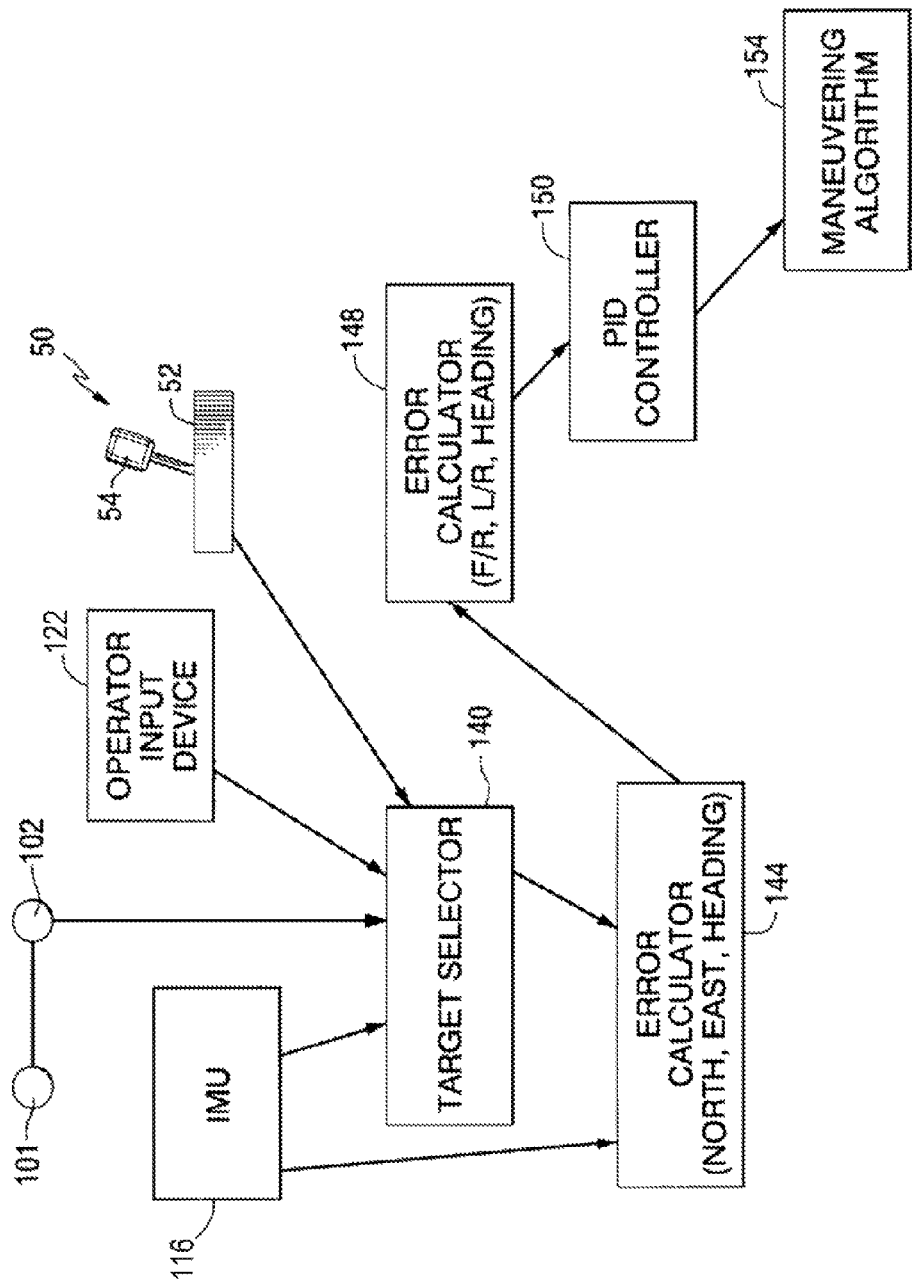
FIG. 14 is a block diagram of functional elements used to perform a station keeping function.

FIG. 14 is a schematic representation of the devices and software used in conjunction with one example of the present disclosure. With references to FIGS. 11-14, the inertial measurement unit (IMU) 106 and the two GPS devices, 101 and 102, provide information to the microcontroller 116 in relation to the absolute global position and heading of the marine vessel 10 and in relation to the velocity and acceleration of the marine vessel 10 in six degrees of freedom which include forward and reverse movement of the vessel, left and right movement of the vessel, and both yaw movements of the vessel.

With continued reference to FIG. 14, a target selector portion 140 of the software receives inputs from the GPS devices 101 and 102, the IMU 106, the user input device 122, and the joystick 50. When the station keeping mode is enabled, by an input from the operator of the marine vessel through the user input device 122, and the joystick 50 is inactive, the target selector portion 140 receives a current set of magnitudes from the IMU 106 and stores those values as the user-desired global position and user-desired heading for the marine vessel 10. In one example, the target selector portion 140 receives this desired position and heading information only when the station keeping mode is enabled by the user input device 122 and the joystick 50 initially becomes inactive after having been active. This user-desired global position and heading information is stored in the memory of the microcontroller 116.

When in the station keeping mode, the GPS devices 101, 102 and the IMU 106 periodically obtain new data, and provide actual position and heading information to an error calculator 144 within the microcontroller 116. This error calculator 144 compares the user-desired global position and user-desired heading to actual values of these two variables. The comparison produces a difference magnitude which is defined in terms of a north-south difference and an east-west difference in combination with a heading angular difference. The north-south difference and east-west difference are the net difference in the longitude and latitude positions represented by the user-desired position and actual position. The heading angular difference is the angular difference between angles A2 and A1 (see FIG. 13).

This information, which is described in terms of global measurements and which is in reference to stationary global references, is provided to an error calculator 148, which resolves those values into forward-reverse, left-right, and heading changes in reference to clockwise and counterclockwise movement of the marine vessel 10. These errors are provided to a PID controller 150.

As is generally known to those skilled in the art, a PID controller uses proportional, integral, and derivative techniques to maintain a measured variable at a preselected set point. Examples of this type of controller are used in cruise control systems for automobiles and temperature control systems of house thermostats. In the proportional band of the controller, the controller output is proportional to the error between the desired magnitude and the measured magnitude. The integral portion of the controller provides a controller output that is proportional to the amount of time that an error, or difference, is present. Otherwise, an offset (i.e. a deviation from set point) can cause the controller to become unstable under certain conditions. The integral portion of the controller reduces the offset. The derivative portion of the controller provides an output that is proportional to the rate of change of the measurement or of the difference between the desired magnitude and the actual current magnitude.

Each of the portions, or control strategies, of the PID controller 150 typically uses an individual gain factor so that the PID controller 150 can be appropriately tuned for each particular application. According to the algorithm described more fully herein below, the PID gains are determined as a function of both a heading error (a difference between a varying target heading and the actual heading) and a position difference between the actual global position and the user-desired global position. However, it should be understood that specific types of PID controllers and specific gains for the proportional, integral, and derivative portions of the controller are not limiting.

With continued reference to FIG. 14, the error correction information provided by the PID controller 150 is then used by the maneuvering algorithm 154 which is described above in greater detail. The maneuvering algorithm 154 receives information describing the required corrective vectors, both the linear corrective vector (for example, 130 in FIG. 13) and the moment corrective vector (for example, 132 in FIG. 13), necessary to reduce the error or difference between the actual global position and heading and the user-desired global position and heading.

When the PID controller 150 receives an error signal for significant periods of time, the integral term of the PID controller 150 will increase at a rate governed by the integral time of the PID controller 150. This will eventually cause the manipulated variable to reach 100% (or 0%) of its scale, i.e., its maximum or minimum limits. According to the algorithm described herein below, the maximum and minimum limits can be manipulated in order to control the ability of the marine vessel 10 to move according to the linear corrective vector 130 and the moment corrective vector 132. The maximum and minimum limits are also determined as a function of both the heading error and the position difference between the actual global position and the user-desired global position.

As described above, a method for positioning a marine vessel 10 comprises the steps of obtaining a measured position of the marine vessel 10. As described in conjunction with FIGS. 11-14, the measured position of the marine vessel 10 is obtained through the use of the GPS devices 101 and 102, in cooperation with the inertial measurement unit (IMU) 106. The present example further comprises the step of selecting a user-desired position 120 of the marine vessel 10. This is done by a target selector portion 140 that responds to being placed in an enabling mode by a user input device 122 in combination with a joystick 50 being placed in an inactive mode. When those situations occur, the target selector portion 140 saves the most recent measured magnitudes of the global position and heading provided by the IMU 106 as the user-desired global position and user-desired heading. One example of the method further comprises the step of determining an actual position and an actual heading of the marine vessel 10. This is done, in conjunction with the error calculator 144, by saving the most recent magnitude received from the IMU 106. The present example further comprises the step of calculating a difference between the user-desired and actual global positions of the marine vessel 10 and calculating a difference between the user-desired and actual headings of the marine vessel 10. These differences are represented by the differences, in longitude and latitude positions, of the center of gravity 12 of the marine vessel 10 between the user-desired and actual global positions and by the difference between angles A2 and A1, respectively. The exemplary method then determines the required movements to reduce the magnitude of these differences. This is done through the use of a PID controller 150. Once these movements are determined, the first and second marine propulsion devices 27, 28 are used to maneuver the marine vessel 10 in such a way that it achieves the required movements to reduce the difference between the user-desired position and the actual position and between the user-desired heading and the actual heading. The steps used to efficiently and accurately maneuver the marine vessel 10 in response to these requirements are described above in detail in conjunction with FIGS. 1-10.

With reference to FIGS. 11 and 14, it should be understood that an alternative example could replace the two GPS devices, 101 and 102, with a single GPS device that provides information concerning the global position, in terms of longitude and latitude, of the marine vessel 10. This single GPS device could be used in combination with an electronic compass which provides heading information, as represented by arrow 110, pertaining to the marine vessel 10. In other words, it is not necessary in all embodiments to utilize two GPS devices to provide both global position and heading information. In the particularly preferred embodiment described above, the two GPS devices work in cooperation with the IMU 106 to provide additional information beyond the global position. In addition to providing information relating to the heading of the marine vessel 10, as represented by arrow 110, the two GPS devices in association with the IMU 106 provide additional information as described above in greater detail. Alternative embodiments, which utilize a single GPS device in cooperation with an electronic compass, are also within the scope of the present disclosure. In fact, any combination of devices that is able to provide information identifying the global position and heading of the marine vessel 10 can be used in conjunction with the present embodiment.

With continued reference to FIGS. 11 and 14, it should also be understood that the IMU 106 could be used as a separate unit which provides data into another device, or vice versa, for the purpose of providing information relating to position and heading correction information. It should therefore be clearly understood that alternative configurations of the IMU 106 and microcontroller 116 could be used in conjunction with the present examples as long as the control circuit 14 is able to provide information relating to the appropriate corrections necessary to cause the marine vessel 10 to move toward a user-desired global position in such a way that its center of gravity 12 remains at its desired position and the heading, as represented by arrow 110, is maintained at the desired heading of the marine vessel 10. Many different examples can be incorporated in the marine vessel 10 for the purposes of providing the information relating to the global position, the heading of the marine vessel 10, and the appropriate thrust vectors necessary to achieve an effective correction of the position and heading of the marine vessel 10 so that it remains at the desired position 120.

Although the description regarding FIGS. 1-14 relates to a marine vessel 10 that is maneuverable by first and second marine propulsion devices 27, 28, it should be recognized that the present disclosure is not limited to such an arrangement. For example, the concepts discussed in this disclosure are operable in conjunction with a system or vessel that is maneuverable by more than two marine propulsion devices, which can include any type of device for providing a propulsive power, such as an inboard arrangement, outboard arrangement, pod arrangement, etc. Further, the concepts disclosed herein are not limited to arrangements that include a pair of global positioning devices and a single IMU unit. Rather, the concepts disclosed herein can be accomplished with more or less such units according to known vessel positioning control structures.

The present inventors have recognized that the amount of available thrust for positioning the marine vessel 10 varies as the microcontroller 116 carries out the station keeping functionality described hereinabove. For example, with reference to FIGS. 1-4, the available thrust to move the marine vessel 10 sideways in the direction of arrow 30 is necessarily less than the available thrust to move the marine vessel 10 forward in the direction of arrow 36. This difference is because (1) propulsion devices such as propeller drives are more efficient while rotating in a forward direction than in a reverse direction and (2) propulsion devices will be more efficient when aligned in the direction of movement of the vessel 10, such as along lines 31' and 32' in FIG. 6, than when aligned to achieve motion transverse to the actual heading of the vessel 10, such as along lines 31 and 32 in FIGS. 2-6. That is, vectoring of the propeller drives to achieve, for example, side directed forces (e.g. F1X, F2X shown in FIGS. 3 and 4) reduces the total available thrust in the actual direction of vessel movement. The marine vessel 10 and related propulsion devices 27, 28 are most efficiently operated when the propulsion devices are oriented in the direction of vessel travel, such as is shown in FIG. 6 with reference to lines 31' and 32'.

Even though the station keeping mode is not always intended to move the marine vessel 10 by significant distances, the present inventors have discovered that a strong wind or current may force the marine vessel 10 off of a user-desired position 120 by such a significant distance that the station keeping algorithm described hereinabove is unable to maintain the marine vessel 10 in the user-desired position 120. In another example, it may be that the operator of the marine vessel wishes to return to a user-desired global position and heading that were previously stored in the memory of the microcontroller 116 after having maneuvered the marine vessel 10 into a position that is generally close to the user-desired position 120. In the event that either of these instances is true, according to the control algorithm described more fully herein below, the marine vessel 10 may be rotated such that its actual heading points towards the user-desired global position at 120 and may then may be driven under the power of forward thrust back to the user-desired global position in order to minimize the position difference between the actual global position and the user-desired global position of the marine vessel 10. Once the position difference falls below a threshold position difference, the marine vessel 10 may be controlled to gradually yaw as the position difference is minimized so as to obtain the user-desired heading as well. Such movement is provided by providing PID control as a function of both a heading error (an error between the actual heading and a target heading, defined herein below) and the position difference (the error between the actual global position and the user-desired global position), as described more fully herein below.

The present inventors also recognized that it would be beneficial to utilize the efficiency of a propeller operating with forward thrust in order to regain the user-desired position 120 when the position difference is greater than a threshold position difference. It should be noted that the value of the threshold position difference is not critical to the function of the system, and can be programmed into the control circuit 14 during its set up or by an operator via the user input device 122. The present inventors have therefore designed a system for orienting a marine vessel 10 that comprises a marine propulsion device, 27 or 28, a control circuit 14 that controls operation of the marine propulsion device 27 or 28, and a user input device 122 that inputs to the control circuit 14 a user-desired global position and a user-desired heading of the marine vessel 10. The control circuit 14 calculates a position difference between the user-desired global position and an actual global position of the marine vessel 10 and controls the marine propulsion device 27 or 28 to minimize the position difference. The control circuit 14 does so by controlling the marine propulsion device 27 or 28 to orient an actual heading of the marine vessel 10 towards the user-desired global position when the position difference is greater than a threshold. When the position difference is less than the threshold, the control circuit 14 controls the marine propulsion device 27 or 28 to minimize a difference between the actual heading and the user-desired heading while minimizing the position difference. One example of the resulting movements of a marine vessel 10 controlled by such a system can be seen in FIG. 15.

Figure 15:
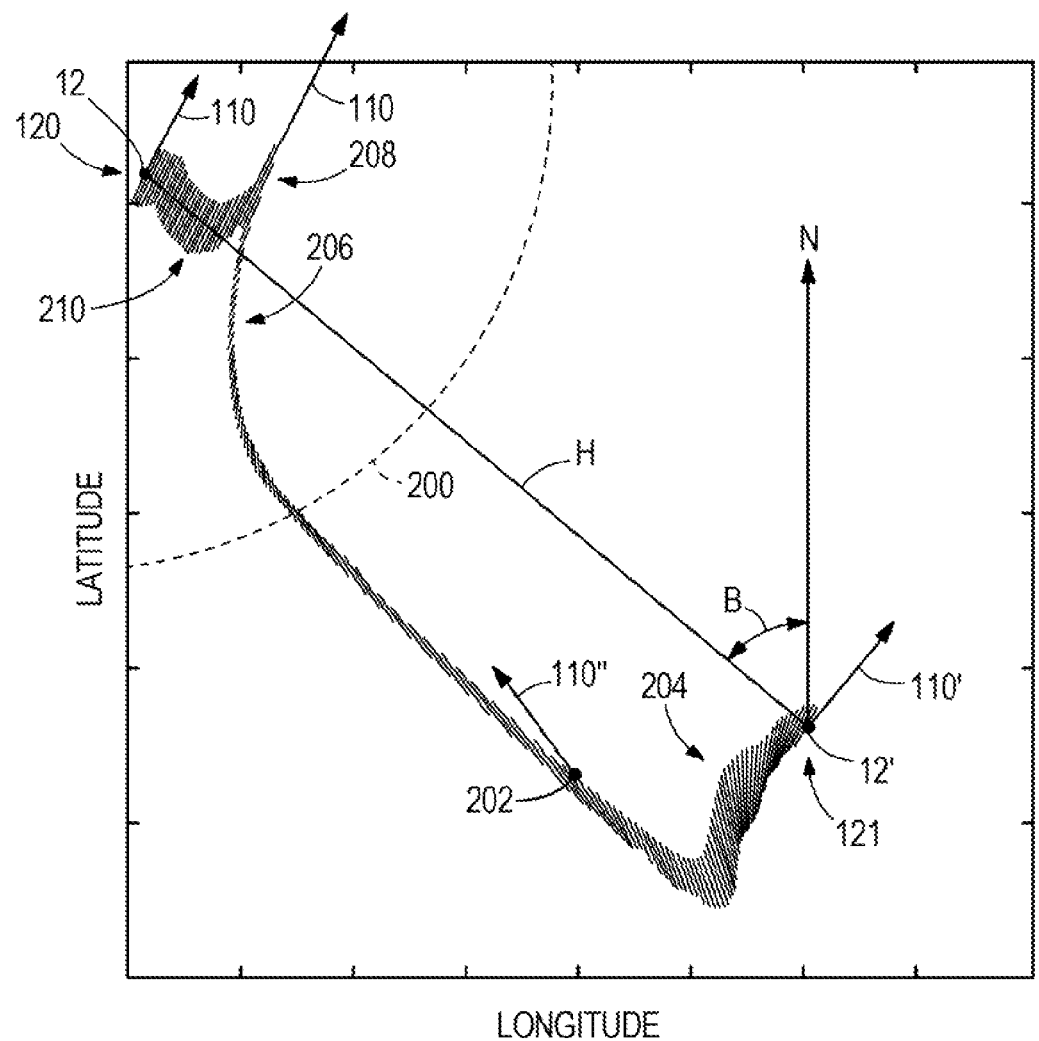
FIG. 15 is a schematic showing various orientations of a marine vessel functioning according to the presently described systems and methods.

FIG. 15 shows one example of various global positions and headings of a marine vessel 10 over time when the marine vessel 10 is controlled according to the algorithm described more fully herein below. Each line in FIG. 15 represents the marine vessel 10 at a different point in time as it is positioned so as to regain its user-desired global position and heading at 120. As in FIGS. 12 and 13, the user-desired heading is in the direction of heading arrow 110 and the center of gravity 12 of the marine vessel 10 is shown at the user-desired global position. When, for example, extreme wind and/or current forces the marine vessel 10 away from this user-desired position 120, the marine vessel 10 is in the subsequent, actual position 121 where its actual heading is represented by the heading arrow 110' and its center of gravity 12' is shown at the actual global position. An exemplary threshold position difference is shown at 200. When a position difference between the user-desired global position and the actual global position of the marine vessel 10 is greater than the threshold 200, the control circuit 14 controls the marine propulsion device 27 or 28 to orient the actual heading of the marine vessel 10 towards the user-desired global position. The control circuit 14 does so by controlling the marine propulsion device 27 or 28 to rotate the marine vessel 10 as shown at 204 until the actual heading of the marine vessel 10 as represented, for example, by heading arrow 110" points in the direction of the user-desired global position at 120. As shown at exemplary point 202, the marine vessel 10 is then oriented such that its heading arrow 110" is in the direction of the user-desired global position at 120.

The marine vessel 10 is then propelled in forward gear as shown, for example, at point 202 so as to minimize the position difference between the user-desired global, position and the actual global position. When the position difference is less than the threshold 200, the control circuit 14 controls the marine propulsion device 27 or 28 to minimize a difference between the actual heading of the marine vessel 10 and the user-desired heading (described above as the difference between angles A2 and A1 in FIG. 13) while minimizing the position difference. In other words, when the position difference is less than the threshold 200, the control circuit 14 causes the marine vessel 10 to rotate as shown at 206 until it achieves the user-desired heading 110 at 208. Once the marine vessel 10 has achieved the user-desired heading 110 as shown at 208, the control circuit 14 minimizes the position difference between the actual global position of the marine vessel 10 as shown at 208 and the user-desired global position as shown at 120. The control circuit 14 does so by causing the marine vessel 10 to translate in a left/right direction as shown at 210.

In other words, in FIG. 15, the marine vessel 10 begins in the subsequent, actual position 121. Because the actual global position at 121 creates a position difference H that is greater than the threshold 200, the control circuit 14 causes the marine vessel 10 to yaw (rotate) as shown at 204 until, for example, at point 202 the actual heading 110" of the marine vessel 10 is pointed in the direction of the user-desired global position at 120. Once the marine vessel 10 has been controlled to yaw to such heading (which will be described further herein below as a target heading), the marine vessel 10 is driven in forward gear towards the user-desired global position, as can be seen, for example, at point 202. The marine vessel 10 continues to be driven towards the user-desired global position until the position difference between the user-desired global position and the actual global position falls below the threshold 200. At this point, the marine vessel 10 is again controlled to yaw as shown at 206 such that its actual heading equals the user-desired heading 110, as can be seen at 208. The marine vessel 10 is then translated in a left/right direction as shown at 210 until it achieves the user-desired global position as shown at 120. At 120, the marine vessel 10 has achieved both the user-desired heading in the direction of heading arrow 110 and the user-desired global position of its center of gravity 12.

Figure 16:
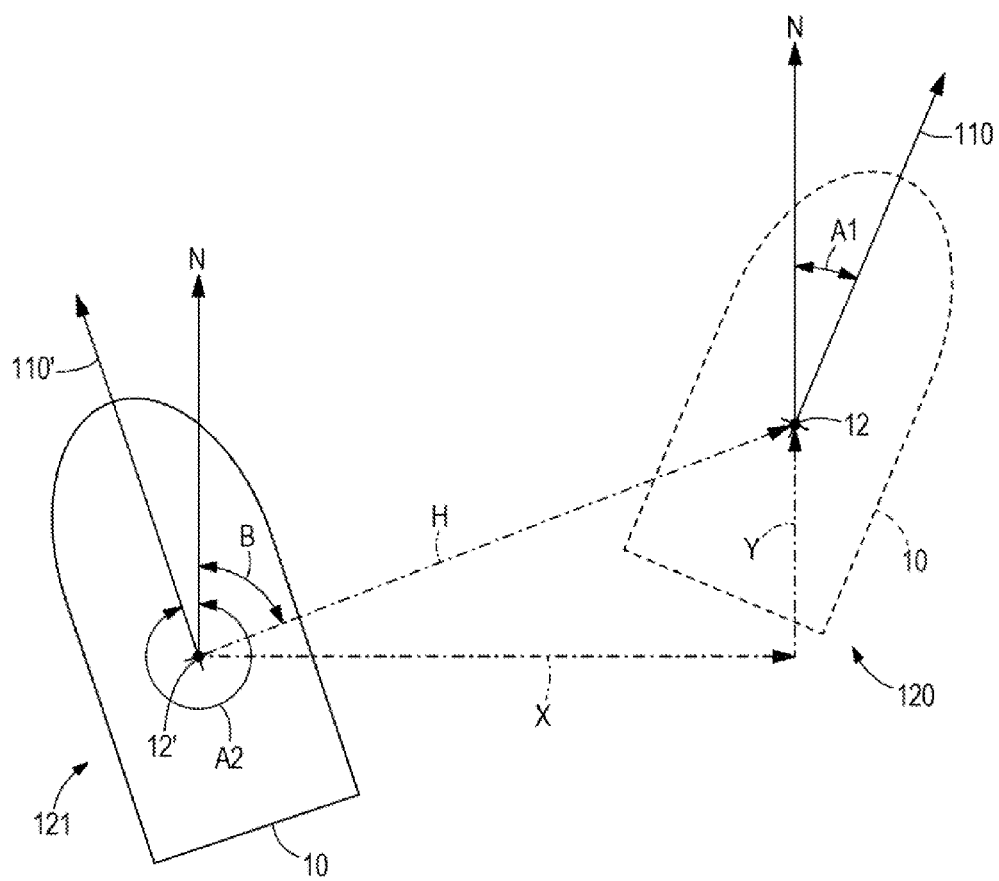
FIG. 16 is a schematic explaining several calculations related to the present systems and methods.

Now with reference to FIG. 16, one example of how the control circuit 14 controls the marine vessel 10 to carry out the behavior shown in FIG. 15 will be more fully described. FIG. 16 shows one example of how to calculate the position difference used during control of the marine vessel 10 as described with reference to FIG. 15. As shown in FIG. 16, the user-desired position 120 of the marine vessel 10 includes a user-desired global position as shown at center of gravity 12 and a user-desired heading represented by heading arrow 110 at an angle A1 with respect to a due north vector N. In the example, the marine vessel 10 has been forced off the initial, user-desired position 120 and into a subsequent, actual position at 121 by wind, waves, and/or other external factors. The control circuit 14 can calculate the position difference between the actual global position at 121 and the user-desired global position at 120 as a length of a hypotenuse H of a triangle having sides representing the left/right (or west/east) error X and the fore/aft (or north/south) error Y. The control circuit 14 can calculate a bearing B with respect to a due north vector N between the actual global position as shown at 121 and the user-desired global position as shown at 120. The hypotenuse H extends from the actual global position at center of gravity 12' to the user-desired global position at center of gravity 12 at the bearing B from the due north vector N. The bearing B can be calculated according to the equation:

$$B = 90 \text{ degrees} - \arctan(Y/X).$$

In one example, the control circuit 14 calculates a varying target heading in order to orient the marine vessel 10 at various headings depending on whether the position difference is greater than or less than the threshold 200. For example, as shown in FIG. 15, the target heading 110" at 202 is in the direction of the user-desired global position. The target heading at 206 and 208 is in the direction of the user-desired heading 110. Thus, the target heading varies as a function of the position difference and changes based on whether the position difference is greater than or less than the threshold 200. For example, the control circuit 14 calculates the target heading as a function of the user-desired heading as shown at 120, the position difference (the length of hypotenuse H), and the bearing B, and controls the marine propulsion device 27 or 28 to orient the actual heading of the marine vessel 10 in the direction of the target heading. According to one example, the target heading can be calculated according to the following equation:

$$\text{Target heading} = \text{user-desired heading} + (\beta)^*(\text{bearing } B - \text{user-desired heading}).$$

In one example, β comes from a look-up table stored, for example, in the memory of the microprocessor 116. The look-up table accepts as an input the position difference, corresponding to the hypotenuse H. In one example, the position difference is a distance squared error calculated according to the following equation:

$$H^2 = X^2 + Y^2.$$

The distance squared error ($H^2$) is fed into the look-up table and a value β is determined. In one example, β ranges from zero to one. For example, β is zero when the position difference is zero and β is one when the position difference is greater than the threshold 200. As noted above, the threshold 200 can be set at any position difference, according to the desires of the operator of the marine vessel and/or during set up of the control circuit 14.

According to the above equation for calculation of the target heading and the above exemplary values of β, it can be seen that when the position difference is greater than the threshold 200 (and therefore β=1), the target heading is equal to the bearing B. Referring back to FIG. 15, this partially explains why the marine vessel 10 is rotated as shown at 204 until its heading arrow 110" extends at the bearing B in the direction of the user-desired global position shown at 120. (Such behavior as shown at 204 is also partially explained by the maximum and minimum PID limits, as will be explained further herein below.) The marine vessel 10 is then propelled by the marine propulsion device 27 or 28 in the direction of the bearing B as shown at 202.

According to the above equation for calculation of the target heading and the above exemplary values of β, it can also be seen that when the position difference is zero (and therefore β=0), the target heading is equal to the user-desired heading. This is reflected in FIG. 15 by the shift inside the threshold 200, where the marine vessel 10 is rotated from 206 to 208 such that the actual heading of the marine vessel 10 is aligned with a target heading that is the same as the user-desired heading 110. In other words, at 208, the target heading is the same as the user-desired heading 110, although the marine vessel 10 has not yet achieved the user-desired global position.

Therefore, according to the control algorithm described herein, the target heading is a varying value that changes based on the user-desired heading, the position difference, and the bearing B. The control circuit 14 controls the marine propulsion device 27 or 28 to orient the actual heading of the marine vessel 10 in the direction of the target heading both when the position difference is greater than the threshold 200 and when the position difference is less than the threshold 200. This can be seen in FIG. 15 where the target heading changes from being in the direction of the bearing B at 202 (as reflected by heading arrow 110") to being in the direction of the user-desired heading 110 as shown by the shift from 206 to 208.

In order to most efficiently propel the marine vessel 10 from the actual position 121 back to the user-desired position 120, the target heading is in the direction of the user-desired global position when the position difference is greater than the threshold 200. This is shown by the target heading 110" at 202. In one example, the target heading can be equal to the bearing B between the actual global position at 121 and the user-desired global position at 120 when the position difference is greater than the threshold 200. Further, in order to obtain the user-desired heading once the marine vessel 10 has been propelled closer to the user-desired position 120, when the position difference is less than the threshold 200, the target heading gradually pivots from being equal to the bearing B between the actual global position and the user-desired global position to being equal to the user-desired heading 110. This gradual pivoting is shown at 206 to 208. The target heading continues to pivot until it is equal to the user-desired heading 110 as shown at 208 and 210. Finally, the target heading remains equal to the user-desired heading 110 when the position difference is zero, as shown at 120.

With reference to both FIGS. 15 and 16, according to the present algorithm, the control circuit 14 controls the marine propulsion device 27 or 28 to control translation of the marine vessel 10 as a function of the position difference and a difference between the target heading and the actual heading, hereinafter referred to as the "heading error". In one example, once the position difference is less than the threshold 200, the control circuit 14 is programmed to provide the marine propulsion device 27 or 28 with full ability to cause the marine vessel 10 to translate such that it can move in either the fore/aft direction and/or the right/left direction. This is shown by the movements occurring from 206 to 208 to 210 to 120. In another example, the control circuit 14 can also control the marine propulsion device 27 or 28 to limit translation of the marine vessel 10 when the position difference is greater than the threshold 200 and the actual heading 110' is not oriented toward the user-desired global position. In other words, as shown at 204, the control system 14 limits the ability of the marine vessel 10 to translate in the fore/aft direction and/or the right/left direction until the actual heading of the marine vessel 10 is oriented towards the user-desired global position at 120 (for example by being oriented in the direction of the bearing B as shown by heading arrow 110"). In both examples, the control circuit 14 limits translation of the marine vessel 10 in the fore/aft direction and/or the right/left direction until the actual heading of the marine vessel 10 is aligned with the target heading, as the target heading is defined herein above.

The limits on the ability of the marine vessel 10 to translate in any of these directions are more fully described herein below with reference to the heading error (defined as target heading minus actual heading). For example, if the heading error is high and the position difference is high, programmed PID limits determine the ability of the propulsion device 27 or 28 to operate to provide the target linear thrust 130 (see FIG. 13) to allow the marine vessel 10 to be rotated. In one example, once the heading error has been minimized (i.e., the actual heading has been aligned with the target heading) the PID limits then allow the marine propulsion device 27 or 28 to cause the marine vessel 10 to translate, for example in a forward direction as shown at 202, toward the user-desired global position. The PID limits on the ability of the marine propulsion device 27 or 28 to operate to provide the target linear thrust 130 are what cause the marine propulsion device 27 or 28 to rotate the marine vessel 10 toward the user-desired position 120 and then drive in forward rather than to sidle in a north-west direction all the way from location 121 to location 120.

Figure 17:
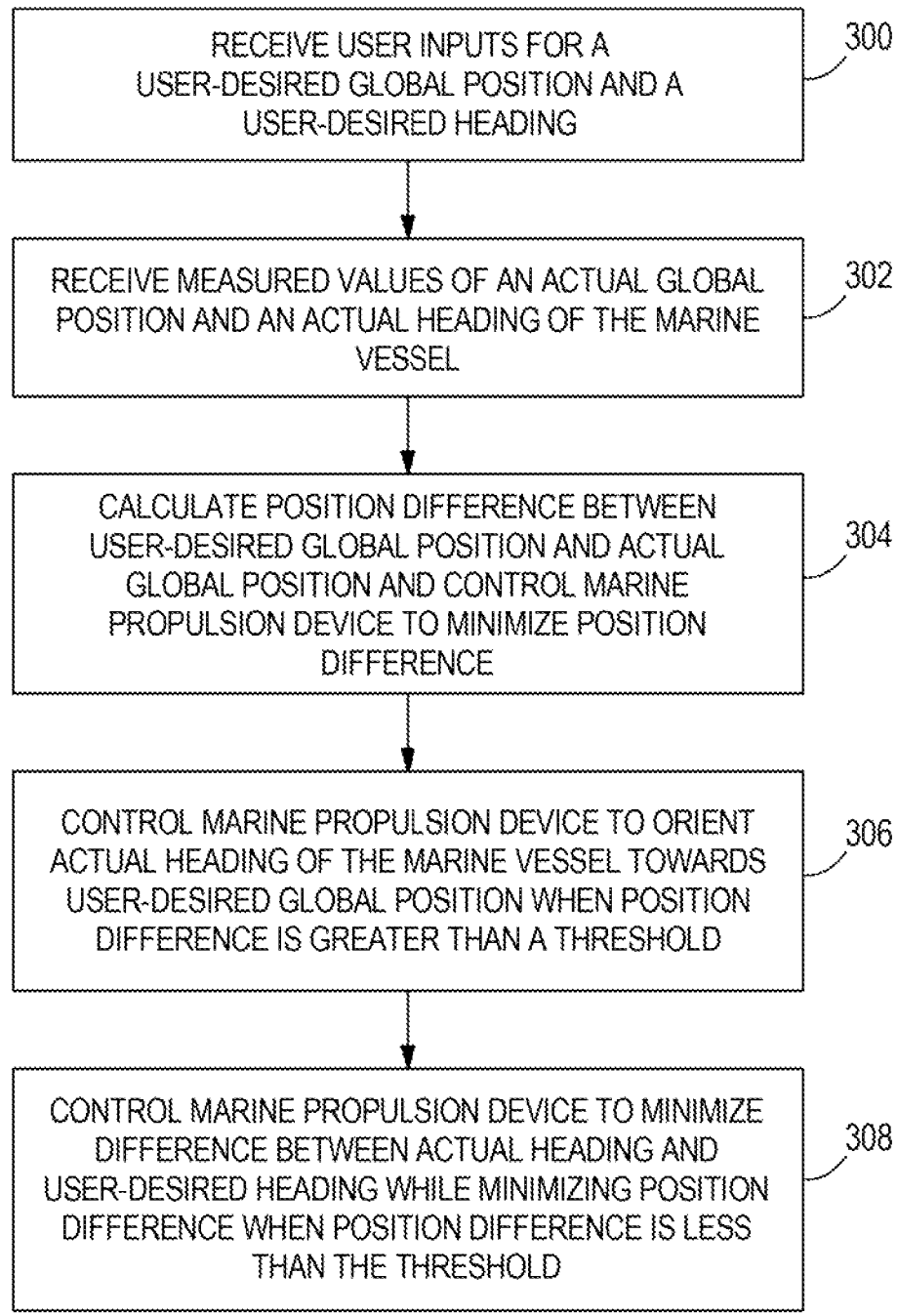
FIG. 17 is one example of a method for positioning a marine vessel.

Control of movement of the marine vessel 10 and calculations related thereto as shown in FIGS. 15 and 16 can be implemented as part of a method for orienting a marine vessel 10 having at least one marine propulsion device 27 or 28 coupled to the marine vessel 10. The method comprises receiving user inputs for a user-desired global position and a user-desired heading of the marine vessel 10, as shown at box 300 in FIG. 17. The method continues to box 302 where it comprises receiving measured values of an actual global position and an actual heading of the marine vessel 10. The method continues by calculating a position difference between the user-desired global position and the actual global position as shown at box 304. This difference can be calculated according to the equations described with reference to FIG. 16. For example, the position difference can be defined in terms of a length of a hypotenuse H of a triangle formed by the X and Y errors between the actual global position and the user-desired global position. With continued reference to box 304, the method includes controlling the marine propulsion device 27 or 28 to minimize the position difference.

At box 306, the method includes controlling the marine propulsion device 27 or 28 to orient the actual heading of the marine vessel 10 towards the user-desired global position when the position difference is greater than the threshold 200. This is reflected by the movements shown at 204 in FIG. 15. The method continues at box 308 by controlling the marine propulsion device 27 or 28 to minimize a difference between the actual heading and the user-desired heading while minimizing the position difference when the position difference is less than the threshold 200. As described above, the method may further comprise controlling the marine propulsion device 27 or 28 to gradually minimize the difference between the actual heading and the user-desired heading as a function of the position difference when the position difference is less than the threshold 200, as shown at 206, 208, and 210 in FIG. 15.

The method may further comprise calculating a target heading as a function of the user-desired heading and the position difference and controlling the marine propulsion device 27 or 28 to orient the actual heading of the marine vessel 10 in the direction of the target heading. In one example, calculation of the target heading can be done according to the method of FIG. 18. At box 312, the method includes receiving the actual global position, the user-desired global position, the actual heading, and the user-desired heading of the marine vessel 10. As described herein above, the actual position and the actual heading can be measured values obtained from the GPS devices 101, 102 and the IMU 106. The user-desired position and the user-desired heading can be values input by an operator via the user input device 122. At box 314, the method includes calculating the bearing B between the actual global position and the user-desired global position. Calculation of the bearing B can be done according to the above-described equations with reference to FIG. 16: B=90 degrees−arctan (Y/X). At box 316, the method includes calculating a difference between the user-desired heading and the bearing B and storing this value as the "angle error". This can be done according to the following equation:

Angle error=bearing $B$−user-desired heading.

Before, after, or simultaneously to boxes 314 and 316, the method includes calculating a position difference between the actual global position and the user-desired global position as shown at box 318. This difference can be calculated as the length of the hypotenuse H between the actual global position and the user-desired global position (see FIG. 16). This difference could alternatively be calculated as the distanced squared error ($H^2$), as described herein above. As shown at box 320, the method includes determining a heading bias gain value. The heading bias gain value can be determined from a look-up table, as described herein above. The heading bias gain value can, for example, be a value β that ranges from zero to one, wherein β=0 when the position difference is zero and β=1 when the position difference is greater than the threshold. The method continues at box 322 by biasing the angle error by the heading bias gain value β and storing this value as the "bearing bias". This can be done according to the equation:

Bearing bias=angle error*heading bias gain value β.

The method continues at box 324, by adding the bearing bias to the user-desired heading and storing this value as the target heading. This can be done according to the equation:

Target heading=bearing bias+user-desired heading.

For ease of turning the marine vessel 10, angular values are modulated so that the marine vessel 10 turns according to the shortest path between the actual heading and the target heading.

Figure 18:
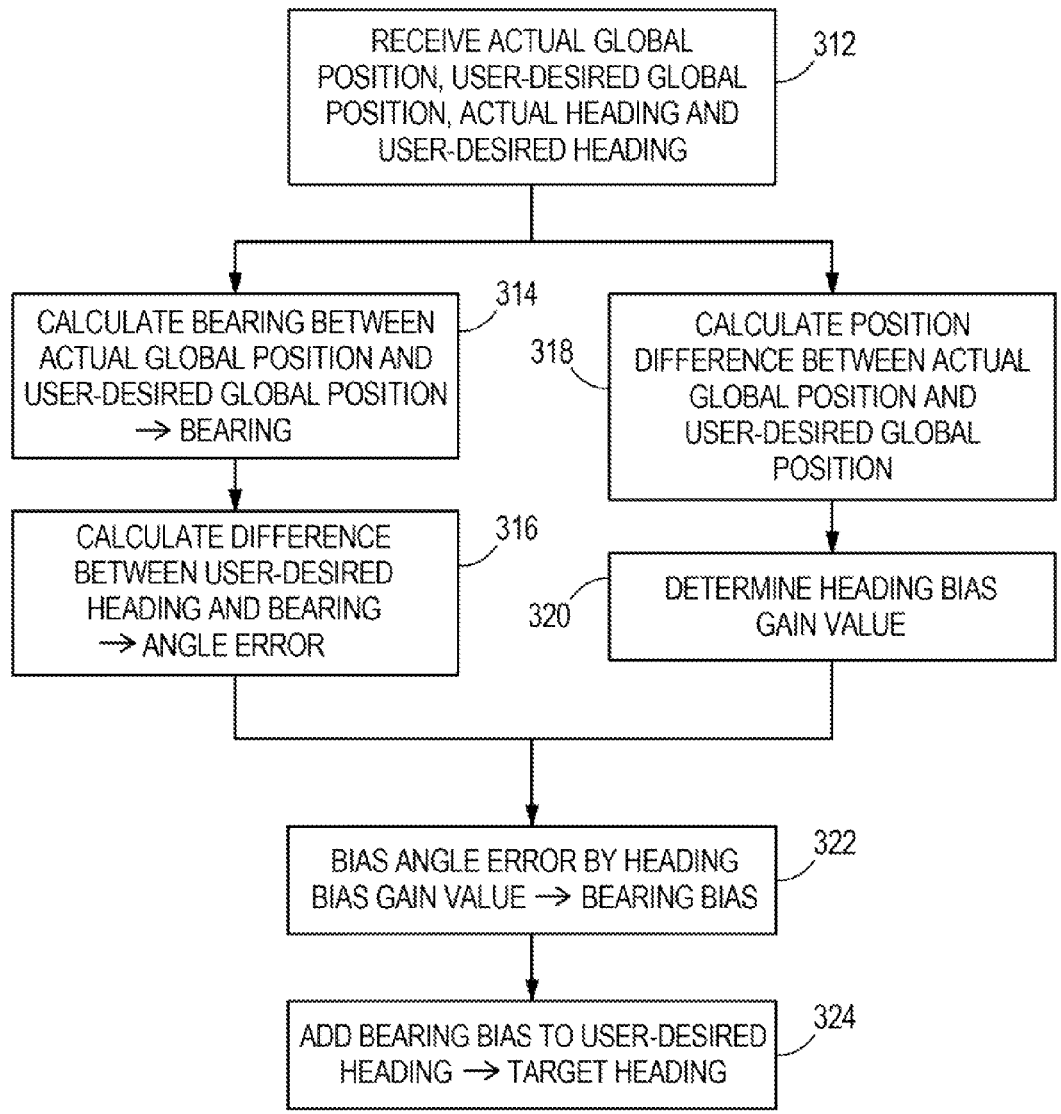
FIG. 18 is another example of a method for positioning a marine vessel.

In other words, the method of FIG. 18 includes calculating a scaled difference between the user-desired heading and the bearing B between the actual global position and the user-desired global position, and adding the scaled difference to the user-desired heading. The scaled difference is what is referred to herein above as the "bearing bias". The difference between the user-desired heading and the bearing B between the actual global position and the user-desired global position (the "angle error") is scaled as a function of the position difference by the heading bias gain value β to determine the bearing bias.

Having thus obtained the target heading according to the method of FIG. 18 and having already measured a value for the actual heading, a heading error may be calculated according to the equation:

$H$-leading error=target heading−actual heading.

Movement of the marine vessel 10 in the fore/aft direction, in the left/right direction, and according to a yaw rotational movement is thereafter controlled based on the heading error. This is described more fully with reference to FIG. 19.

Figure 19:
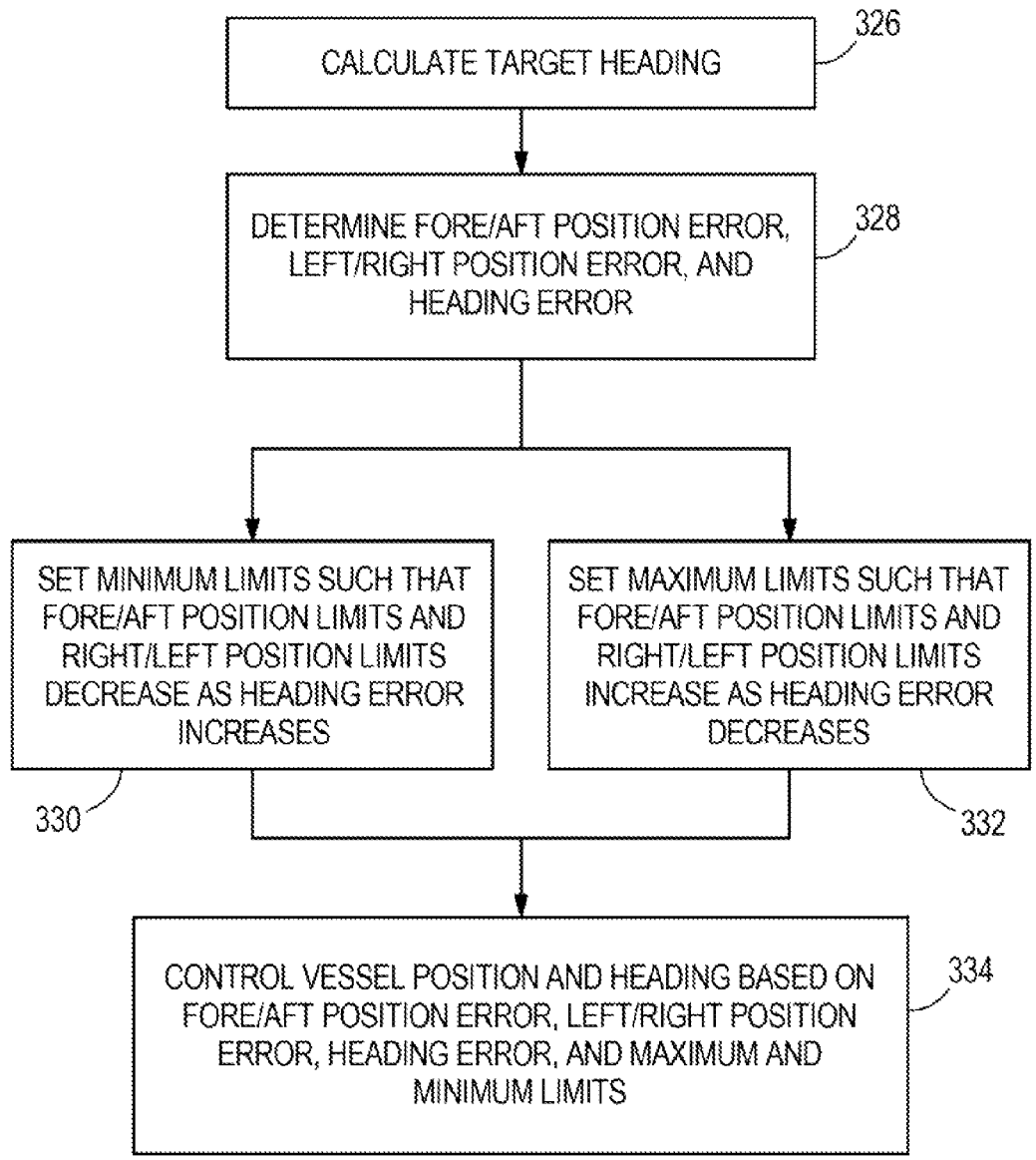
FIG. 19 is another example of a method for positioning a marine vessel.

As shown in FIG. 19, at box 326, a method for orienting the marine vessel 10 includes calculating the target heading, for example according to the steps described above with reference to FIG. 18. The method continues to box 328, where it includes determining the fore/aft position error, the left/right position error, and the heading error between the actual position at 121 and the user-desired position at 120. This is done according to the calculations described with reference to FIG. 16. The fore/aft (or north/south) position error is equal to the side of the triangle labeled Y, the left/right (or west/east) position error is equal to the side of the triangle labeled X, and the heading error is determined according to the equations provided above. PID limits that determine the ability of the marine propulsion device 27 or 28 to provide the target linear thrust 130 to cause the marine vessel 10 to translate in the fore/aft direction and the left/right direction are then calculated using look-up tables as described below.

Maximum and minimum limits that determine the ability of the marine propulsion device 27 or 28 to provide the target linear thrust 130 to cause the marine vessel 10 to translate in the fore/aft direction are determined from a look-up table according to inputs of the fore/aft position error and the heading error. When the fore/aft position error is low and the heading error is low, there is no limit on the ability of the marine propulsion device 27 or 28 to cause the marine vessel 10 to translate the fore/aft direction. Conversely, when the fore/aft position error is high and the heading error is high, the marine propulsion device 27 or 28 has very limited ability to cause the marine vessel 10 to translate in the fore/aft direction.

Maximum and minimum limits that determine the ability of the marine propulsion device 27 or 28 to provide the target linear thrust 130 to cause the marine vessel 10 to translate in the left/right direction are also determined from a look-up table. When the left/right position error is low and the heading error is low, there is no limit on the ability of the marine propulsion device 27 or 28 to cause the marine vessel 10 to translate in the left/right direction. Conversely, when the left/right position error is high and the heading error is high, the marine propulsion device 27 or 28 has very limited ability to cause the marine vessel 10 to translate in the left/right direction.

Meanwhile, the position difference (for example the distance squared error $H^2$, described above with reference to FIG. 16) and the heading error are input into a different look-up table, which contains maximum and minimum PID limits that determine the ability of the marine propulsion device 27 or 28 to provide the target moment 132 (FIG. 13) to cause the marine vessel 10 to yaw. In one example, the maximum and minimum limits provide unlimited authority to the marine propulsion device 27 or 28 to cause the marine vessel 10 to yaw. The result of these maximum and minimum PID limits on the ability of the marine propulsion device 27 or 28 to provide the target moment 132 is movement of the marine vessel 10 as shown at 204 in FIG. 15, where the marine vessel 10 is controlled to yaw from the heading 110' shown at 121 to the heading 110" shown at 202.

In other words, behavior of the marine vessel 10 as shown at 204 is determined by PID limits that do not give the marine propulsion device 27 or 28 full ability to provide the target linear thrust 130 to cause the marine vessel 10 to translate in the fore/aft direction or the left/right direction, but that do give the marine propulsion device 27 or 28 full ability to provide the target moment 132. These PID limits effectively prioritize the ability of the marine propulsion device 27 or 28 to cause the marine vessel 10 to yaw rather than to translate. The marine vessel 10 is rotated according to this prioritized yaw authority such that the actual heading 110" of the marine vessel 10 is oriented towards the user-desired global position at 120 when the position difference is greater than the threshold 200.

At the same time, other look-up tables containing maximum and minimum PID limits are accessed that allow the marine propulsion device 27 or 28 to propel the marine vessel 10 in the fore/aft direction when the fore/aft position error is high and the heading error is low. This allows forward movement of the marine vessel 10 in the direction of the user-desired global position as shown at 202. The maximum and minimum PID limit look-up tables also allow the marine propulsion device 27 or 28 to propel the marine vessel 10 in the left/right direction when the left/right position error is high and the heading error is low. This allows translation of the marine vessel 10 in the fore/aft and left/right directions as shown at 208 and 210, respectively, in FIG. 15.

In other words, as shown at box 330, the method includes setting minimum PID limits on translation of the marine vessel 10 such that fore/aft position PID limits and left/right position PID limits decrease as the heading error increases. As shown at box 332, the method also includes setting maximum PID limits such that the fore/aft position PID limits and the left/right position PID limits increase as the heading error decreases.

As shown at box 334, the method includes controlling both the global position and the heading of the marine vessel 10 based on the fore/aft position error, the left/right position error, the heading error, and the maximum and minimum PID limits.

The above described systems and methods provide the control system with balanced authority to control the marine vessel 10 according to fore/aft, left/right, and yaw movements. Such a balance of authority prevents aggressive maneuvers of the marine vessel 10 by the station keeping algorithm that could ultimately result in discomfort to the occupants of the marine vessel 10 or lead to propulsion failure, such as propeller blowout that occurs when the marine propulsion devices 27, 28 are operating in other than forward gear and oriented in other than a forward direction. The control system is provided with balanced authority by providing PID gains that are a function of the position difference. In other words, the fore/aft gain is a function of the Y position error and the heading error. The left/right gain is a function of the X position error and the heading error. The yaw gain is a function of the distance squared position difference ($H^2$) and the heading error. Further, the PID limits in each axis of control are a function of position difference as well. The fore/aft PID limit is a function of the Y position error and the heading error. The left/right PID limit is a function of the X position error and the heading error. The yaw PID limit is a function of the distance squared position difference ($H^2$) and the heading error. Such PID limits provide the control system with the ability to prioritize XY position control over yaw orientation and vice versa, depending on the position difference between the actual global position and the user-desired global position.

The ability to prioritize how the marine vessel 10 moves towards the user-desired position 120 allows the control circuit 14 to request movement from the marine propulsion devices 27, 28 according to the ability of the devices 27, 28 to move the vessel 10 most easily in the fore/aft direction, next to yaw, and next in the left/right direction. This provides bathtub-shaped gain scheduling to the station keeping algorithm that inherently softens control when the marine vessel 10 approaches the user-desired position 120. This bathtub-shaped gain scheduling can be seen at 206, 208, and 210 in FIG. 15. This gain scheduling causes the control circuit 14 to control the marine vessel 10 such that it is driven smoothly into an orientation from which it can most efficiently achieve the user-desired position 120, even when extreme wind and/or current has forced the marine vessel 10 away from this position 120.

According to the station keeping functionality described above, a selected global position and a selected heading can be maintained despite external forces acting on the vessel 10, such as wind, waves, etc. to move the vessel out of the selected global position and selected heading. The control circuit 14 is programmed to rotate the propulsion devices 27, 28 about the steering axes 21, 22 to achieve a target linear thrust 130 and target moment 132 (see FIG. 13 and related description herein above) that are necessary to counteract the external forces and thereby achieve both the vessel's initial or user-desired global position and the vessel's initial or user-desired heading even after strong wind and/or current has forced the marine vessel 10 from the user-desired position 120.

In the above description certain terms have been used for brevity, clearness and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. Each limitation in the appended claims is intended to invoke interpretation under 35 USC §112, sixth paragraph only the terms "means for" or "step for" are explicitly recited in the respective limitation. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A system for orienting a marine vessel, the system comprising:
   a marine propulsion device;
   a control circuit that controls operation of the marine propulsion device;
   a user input device that inputs to the control circuit a user-desired global position and a user-desired heading of the marine vessel;
   wherein the control circuit calculates a position difference between the user-desired global position and an actual global position of the marine vessel;
   wherein, when the position difference is greater than a threshold distance from the user-desired global position and an actual heading of the marine vessel is not oriented towards the user-desired global position, the control circuit provides no authority for the marine vessel to translate in a fore/aft direction and a left/right direction and controls the marine propulsion device to cause the marine vessel to yaw until the actual heading is oriented towards the user-desired global position;

wherein, when the position difference is greater than the threshold distance and the actual heading is oriented towards the user-desired global position, the control circuit thereafter controls the marine propulsion device to drive the marine vessel in forward gear so as to minimize the position difference;

wherein, when the position difference is less than the threshold distance and the actual heading is not equal to the user-desired heading, the control circuit provides an increasing amount of authority for the marine vessel to translate in the fore/aft direction and the left/right direction and at the same time controls the marine propulsion device to cause the marine vessel to yaw so as to minimize a difference between the actual heading and the user-desired heading; and wherein, when the position difference is less than the threshold distance and the actual heading is equal to the user-desired heading, the control circuit provides full authority for the marine vessel to translate in the fore/aft direction and the left/right direction so as to minimize the position difference.

2. The system of claim 1, wherein when the position difference is less than the threshold distance from the user-desired global position, the control circuit controls the marine propulsion device to gradually minimize the difference between the actual heading and the user-desired heading as a function of the position difference.

3. The system of claim 2, wherein the control circuit calculates a target heading as a function of the user-desired heading and the position difference and controls the marine propulsion device to cause the marine vessel to yaw such that the actual heading of the marine vessel is oriented in the direction of the target heading.

4. The system of claim 3, wherein the target heading is equal to a bearing between the actual global position and the user-desired global position when the position difference is greater than the threshold distance from the user-desired global position.

5. The system of claim 4, wherein when the position difference is less than the threshold distance from the user-desired global position, the target heading gradually pivots from being equal to the bearing between the actual global position and the user-desired global position to being equal to the user-desired heading.

6. The system of claim 5, wherein the target heading is equal to the user-desired heading when the position difference is zero.

7. The system of claim 3, wherein the control circuit controls the marine propulsion device to control translation of the marine vessel in the fore/aft direction and the left/right direction as a function of the position difference and a difference between the target heading and the actual heading.

8. A method for orienting a marine vessel having at least one marine propulsion device coupled to the marine vessel, the method comprising:

receiving user inputs for a user-desired global position and a user-desired heading of the marine vessel;

receiving measured values of an actual global position and an actual heading of the marine vessel;

calculating a position difference between the user-desired global, position and the actual global position;

when the position difference is greater than a threshold distance from the user-desired global position, controlling the marine propulsion device to cause the marine vessel to yaw until an actual heading of the marine vessel is oriented towards the user-desired global position, while at the sane time limiting translation of the marine vessel in a fore/aft direction and a left/right direction;

once the actual heading of the marine vessel is oriented towards the user-desired global position, thereafter controlling the marine propulsion device to drive the marine vessel in forward gear so as to minimize the position difference; and when the position difference is less than the threshold distance from the user-desired global position, controlling the marine propulsion device to thereafter cause the marine vessel to yaw until the actual heading equals the user-desired heading, and thereafter controlling the marine propulsion device to cause the marine vessel to translate in the fore/aft direction and the left/right direction so as to minimize the position difference.

9. The method of claim 8, further comprising controlling the marine propulsion device to gradually minimize the difference between the actual heading and the user-desired heading as a function of the position difference when the position difference is less than the threshold distance from the user-desired global position.

10. The method of claim 9, further comprising calculating a target heading as a function of the user-desired heading and the position difference and controlling the marine propulsion device to cause the marine vessel to yaw such that the actual heading of the marine vessel is oriented in the direction of the target heading.

11. The method of claim 10, wherein the target heading is equal to a bearing between the actual global position and the user-desired global position when the position difference is greater than the threshold distance from the user-desired global position.

12. The method of claim 11, wherein when the position difference is less than the threshold distance from the user-desired global position, the target heading gradually pivots from being equal to the bearing between the actual global position and the user-desired global position to being equal to the user-desired heading.

13. The method of claim 12, wherein the target heading is equal to the user-desired heading when the position difference is zero.

14. The method of claim 11, wherein calculating the target heading comprises:

calculating a difference between the user-desired heading and the bearing between the actual global position and the user-desired global position;

scaling the difference to calculate a scaled difference; and adding the scaled difference to the user-desired heading.

15. The method of claim 14, wherein the difference between the user-desired heading and the bearing between the actual global position and the user-desired global position is scaled as a function of the position difference.

16. The method of claim 10, further comprising controlling the marine propulsion device to control translation of the marine vessel in the fore/aft direction and the left/right direction as a function of the position difference and a difference between the target heading and the actual heading.

17. The method of claim 10, further comprising:

determining a fore/aft position error component of the position difference;

determining a left/right position error component of the position difference;

determining a heading error based on a difference between the target heading and the actual heading;

controlling the marine propulsion device to substantially prevent translation of the marine vessel in the fore/aft direction when the fore/aft position error is greater than a predetermined fore/aft position error threshold and the heading error is greater than a first predetermined heading error threshold; and controlling the marine propulsion device to substantially prevent translation of the marine vessel in the left/right direction when the left/right position error is greater than a predetermined left/right position error threshold and the heading error is greater than a second predetermined heading error threshold.

18. The method of claim 15, further comprising calculating the target heading according to the following equation:

$$\text{target heading} = \text{user-desired heading} + (\beta)^*(\text{bearing} - \text{user-desired heading});$$

wherein the bearing is the bearing between the actual global position and the user-desired global position;

wherein $\beta$ is determined from a look-up table that accepts the position difference as an input;

wherein $\beta$ ranges from zero to one;

wherein $\beta$ equals zero when the position difference is zero;

wherein $\beta$ equals one when the position difference is greater than the threshold distance from the user-desired global position; and wherein values of $\beta$ between zero and one result in a target heading that is incrementally closer to the user-desired heading as the position difference decreases, thereby causing the marine vessel to smoothly yaw to the user-desired heading when the marine vessel is within the threshold distance from the user-desired global position.

* * * * *